(12) United States Patent
Pursifull

(10) Patent No.: US 10,006,387 B2
(45) Date of Patent: Jun. 26, 2018

(54) SYSTEM AND METHOD FOR IMPROVING CANISTER PURGING

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days. days.

(21) Appl. No.: 15/438,657

(22) Filed: Feb. 21, 2017

(65) Prior Publication Data
US 2017/0159585 A1 Jun. 8, 2017

Related U.S. Application Data

(63) Continuation of application No. 14/740,619, filed on Jun. 16, 2015, now Pat. No. 9,574,507.

(51) Int. Cl.
F02D 41/00 (2006.01)
F02M 25/08 (2006.01)
F02B 33/44 (2006.01)
F02M 35/10 (2006.01)
F02M 35/104 (2006.01)
B01D 53/04 (2006.01)

(52) U.S. Cl.
CPC ....... F02D 41/004 (2013.01); B01D 53/0454 (2013.01); F02B 33/44 (2013.01); F02D 41/0007 (2013.01); F02M 25/089 (2013.01); F02M 25/0836 (2013.01); F02M 25/0854 (2013.01); F02M 25/0872 (2013.01); F02M 35/104 (2013.01); F02M 35/10222 (2013.01); B01D 2257/7022 (2013.01); B01D 2259/4516 (2013.01); F02D 2200/0406 (2013.01)

(58) Field of Classification Search
CPC .... F02D 41/00; F02D 41/004; F02D 41/0007; F02D 41/0032; F02D 41/26; F02M 25/08; F02M 25/0836; F02M 25/0854; F02M 25/0872; F02M 25/089; F02M 35/104; F02M 35/10222
See application file for complete search history.

(56) References Cited

U.S. PATENT DOCUMENTS

| 6,910,467 | B2 | 6/2005 | Murakami et al. |
| 7,966,996 | B1 | 6/2011 | Pursifull |
| 8,297,263 | B2 | 10/2012 | Pursifull |
| 8,483,934 | B2 | 7/2013 | Cunningham et al. |
| 8,511,285 | B2 | 8/2013 | Konohara et al. |

(Continued)

FOREIGN PATENT DOCUMENTS

DE 102011084539 B3 12/2012

Primary Examiner — Hieu T Vo
(74) Attorney, Agent, or Firm — Julia Voutyras; McCoy Russell LLP

(57) ABSTRACT

Systems and methods are provided for controlling a purging operation of a fuel vapor canister in a boosted engine. One method comprises purging stored fuel vapors from the fuel vapor canister to an inlet of the compressor via an ejector while bypassing a canister purge valve, the ejector being fluidically coupled to the fuel vapor canister by a distinct passage coupled upstream of the canister purge valve, where motive flow through the ejector may be regulated by a shut-off valve. The shut-off valve may be adjusted based on whether or not the engine is boosted.

18 Claims, 7 Drawing Sheets

(56) References Cited

U.S. PATENT DOCUMENTS

| | | |
|---|---|---|
| 8,739,766 B2 | 6/2014 | Jentz et al. |
| 9,574,507 B2 * | 2/2017 | Pursifull ............. F02D 41/0032 |
| 9,874,137 B2 * | 1/2018 | Pursifull ................ F02B 33/44 |
| 2012/0016566 A1 | 1/2012 | Cunningham et al. |
| 2016/0201612 A1 | 7/2016 | Pursifull et al. |
| 2016/0201613 A1 | 7/2016 | Ulrey et al. |
| 2016/0201615 A1 | 7/2016 | Pursifull et al. |

* cited by examiner

SYSTEM AND METHOD FOR IMPROVING CANISTER PURGING

CROSS-REFERENCE TO RELATED APPLICATION

The present application is a continuation of U.S. patent application Ser. No. 14/740,619 entitled "SYSTEM AND METHOD FOR IMPROVING CANISTER PURGING," filed on Jun. 16, 2015, now U.S. Pat. No. 9,574,507, the entire contents of which are incorporated herein by reference for all purposes.

FIELD

The present disclosure relates to systems and methods for improving purging of fuel vapors from a fuel vapor canister.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system may allow the vapors to be purged into an engine intake manifold for use as fuel.

The purging of fuel vapors from the fuel vapor canister may involve opening a canister purge valve coupled to a conduit between the fuel vapor canister and the intake manifold. During a purge operation, vacuum or negative pressure in the intake manifold may draw air through the fuel vapor canister enabling desorption of fuel vapors from the canister. These desorbed fuel vapors may flow through the canister purge valve into the intake manifold. As such, the canister purge valve may regulate the flow of fuel vapors into the intake manifold via a sonic choke positioned in series with the canister purge valve. Accordingly, the sonic choke may function as a flow restrictor in the purge path between the valve and the intake manifold.

In boosted engines, during boost conditions when the compressor is operative, the intake manifold may have a positive pressure. Herein, an ejector coupled in a compressor bypass passage may generate vacuum that can be used to draw stored fuel vapors from the fuel vapor canister. However, purge flow through the ejector may be lower because the sonic choke in the canister purge valve may excessively restrict canister purge flow to the suction port of the ejector. Accordingly, a performance of the ejector in terms of purging the fuel vapor canister may be severely diminished by the presence of the sonic choke in the flow path.

An example approach demonstrating an improved purging operation is shown by Stephani in DE 011084539. Herein, an ejector coupled in the compressor bypass passage directly communicates with the fuel vapor canister such that fuel vapors are purged to the ejector from the fuel vapor canister without flowing through a canister purge valve. By directly coupling the fuel vapor canister to the ejector, the metering effect of the sonic choke in the canister purge valve may be circumvented. A diverter valve in the compressor bypass passage regulates flow through the ejector and therefore, purging of the fuel vapor canister.

The inventors herein have identified potential issues with the above approach. The approach in DE 102011084539 is primarily used during non-idle conditions when the ejector can generate a vacuum to draw purged fuel vapors. Thus, boost levels must be high enough to generate a sufficient vacuum at the ejector for drawing purged fuel vapors. As such, during lower boost levels, the purging efficiency may be reduced. Accordingly, manifold vacuum during idle conditions may not be availed for canister purging.

The inventors herein have recognized the above issues and identified an approach to at least partly address the issues. In one example approach, a method may comprise: during boosted conditions, generating vacuum by recirculating compressed air through an ejector coupled in a compressor bypass passage, applying a first portion of the vacuum on a purge line downstream of a canister purge valve, and applying a second, remaining portion of the vacuum on the purge line upstream of the canister purge valve.

The method may additionally or alternatively comprise adjusting a ratio of the first portion of vacuum relative to the second portion of vacuum applied based on one or more of a canister load, a time since a previous purge, intake manifold vacuum level, and boost level. Adjusting the ratio may in some examples include, as the canister load increases, increasing the first portion of the vacuum applied on the purge line downstream of the canister purge valve relative to the second portion of the vacuum applied on the purge line upstream of the canister purge valve.

In another representation, a method for a boosted engine may comprise: during a first condition, flowing stored fuel vapors from a canister into an intake manifold via a canister purge valve, during a second condition, flowing stored fuel vapors from the canister into a suction port of an ejector coupled in a compressor bypass passage, the stored fuel vapors flowing through a bypass passage circumventing the canister purge valve, and during a third condition, flowing stored fuel vapors from the canister into each of the suction port of the ejector and the intake manifold via the canister purge valve, the stored fuel vapors flowing into the suction port of the ejector via each of the canister purge valve and a check valve.

In some examples, during the first condition, the stored fuel vapors may not flow through a bypass valve coupled in the bypass passage or the check valve, during the second condition, the stored fuel vapors may not flow through the purge valve or the check valve, and during the third condition, the stored fuel vapors do not flow through the bypass valve. Additionally, the first condition may include engine operation with natural aspiration, and each of the second and third conditions may include engine operation with boost, a boost level during the second condition being higher than the boost level during the third condition.

In this way, the amount of fuel vapors that may be purged from a fuel vapor canister during boosted conditions in a turbocharged engine may be increased. Further, the amount of fuel vapors that may be purged from a fuel vapor canister during shallow intake manifold vacuum levels may be increased. By coupling the ejector to the fuel vapor canister via two separate flow paths, one through a canister purge valve, and the other through a bypass valve, the canister purge valve may be circumvented and a purge flow rate to the compressor inlet may be enhanced during boosted conditions where manifold vacuum is lower. Further, by controlling compressor bypass flow and ejector vacuum via an ejector shut-off valve based on engine conditions, engine performance may be enhanced. Overall, vehicle fuel economy and emissions compliance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
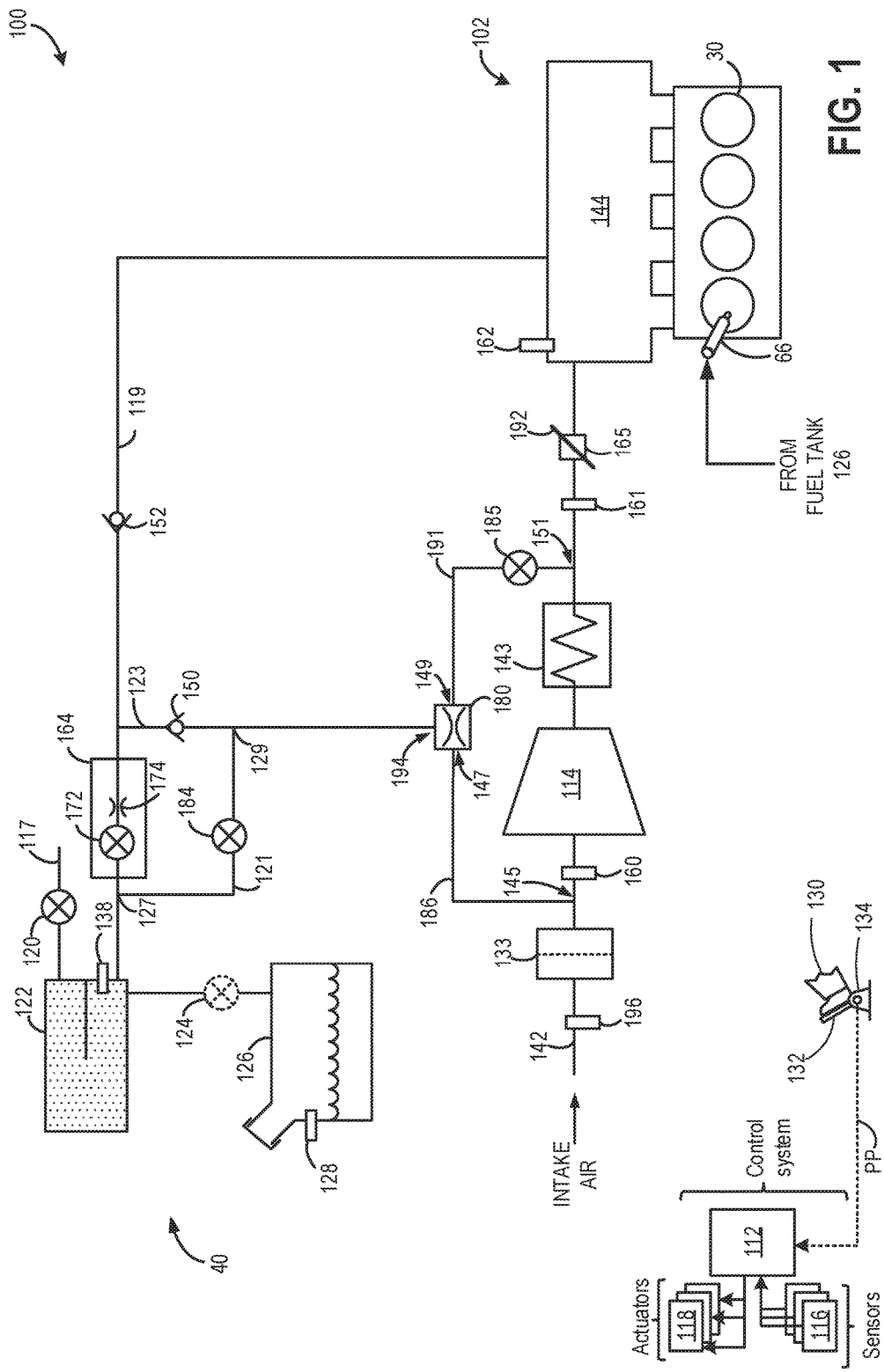
FIG. 1 is a schematic depiction of an example engine system including an example canister purge bypass valve, according to the present disclosure.
Figure 2A:
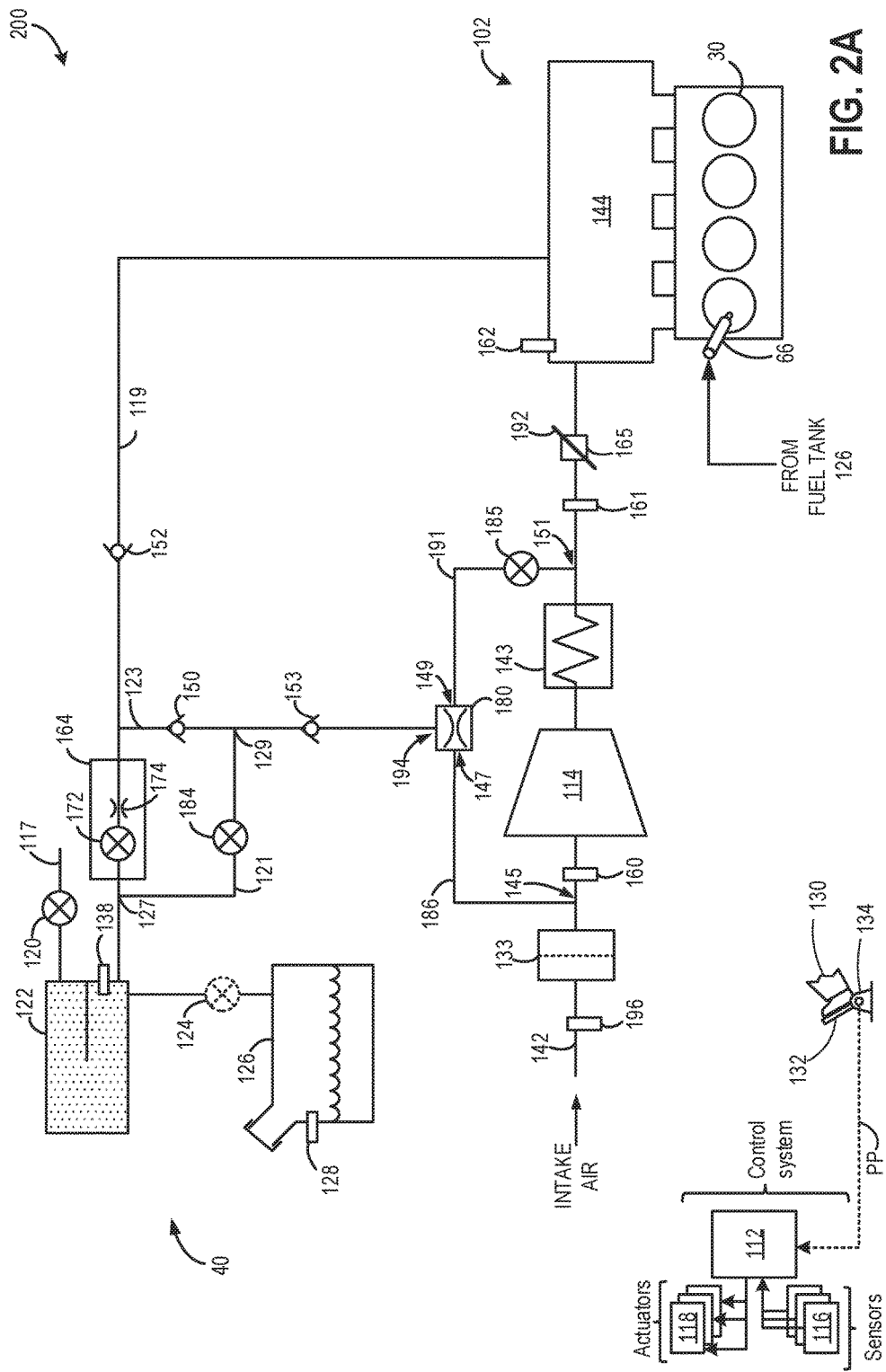
FIG. 2A is an alternate embodiment of the engine system and the canister purge bypass valve of FIG. 1, according to the present disclosure.
Figure 2B:
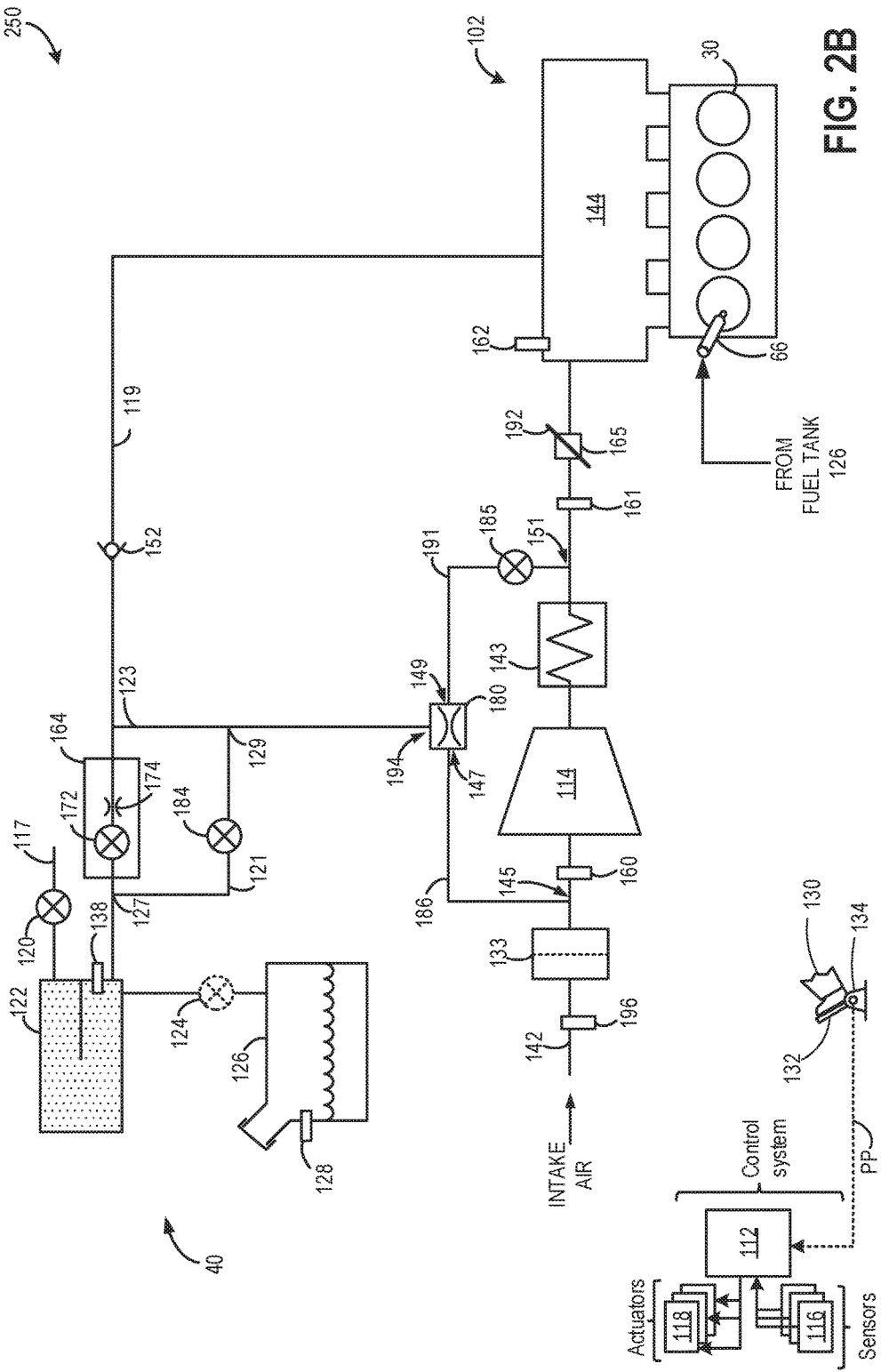
FIG. 2B is an alternate embodiment of the engine system and the canister purge bypass valve of FIG. 1, according to the present disclosure.
Figure 3:
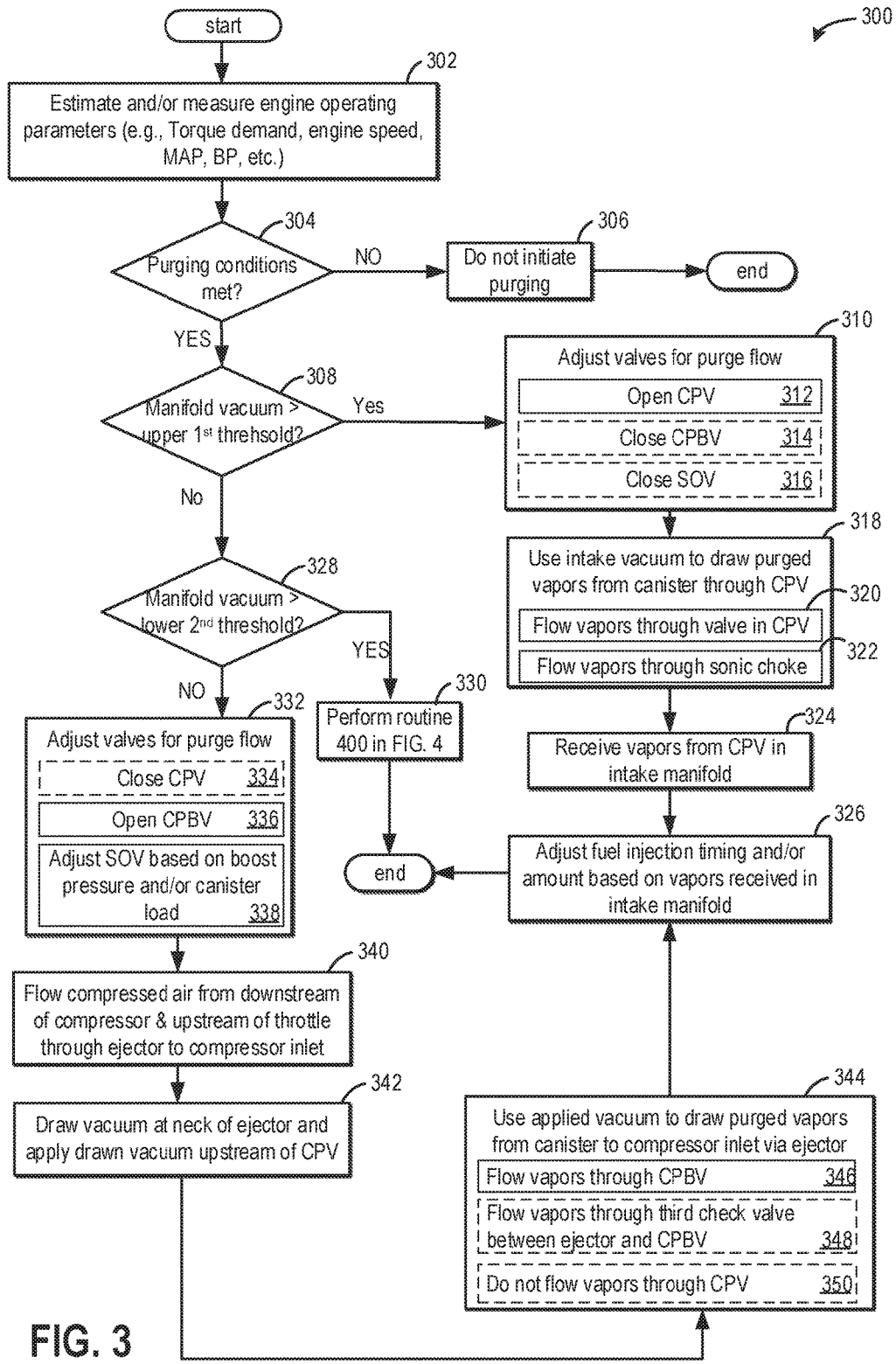
FIG. 3 presents a high level flowchart illustrating purge flow during boosted and non-boosted conditions.
Figure 4:
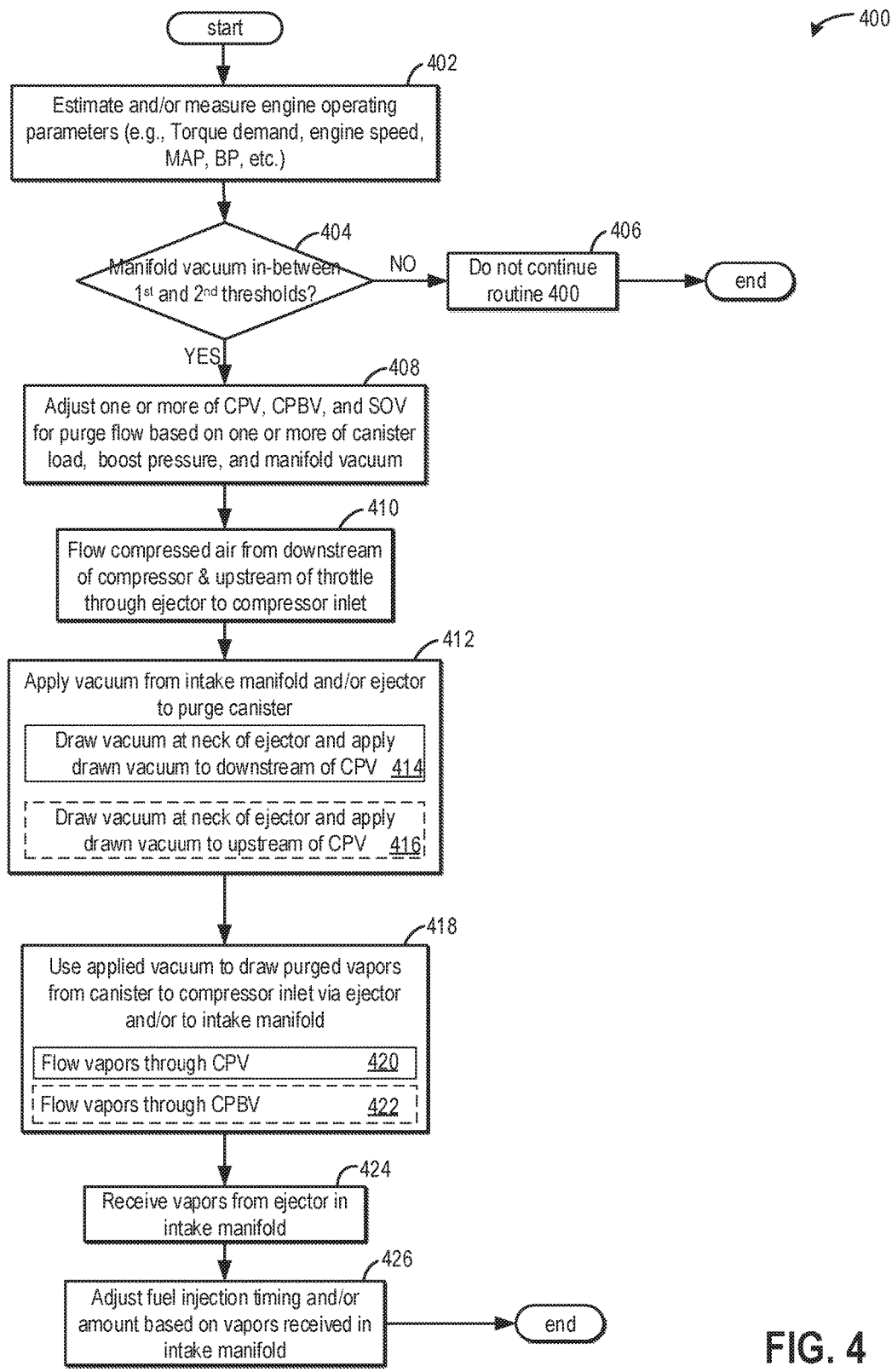
FIG. 4 depicts a high level flowchart for purge flow during boosted conditions.

The following detailed description relates to systems and methods for improving purging of a fuel vapor canister included in an engine system, such as the engine system of FIGS. 1-2B. The engine system may be a boosted engine including a turbine and a compressor. The fuel vapor canister may be coupled to an engine intake via a canister purge valve, where the canister purge valve may include a solenoid valve and a sonic choke housed within a common container of the canister purge valve. Stored fuel vapors in the fuel vapor canister may be purged via two paths into an intake of the engine. During non-boosted conditions, fuel vapors may be purged via the solenoid valve and through the sonic choke of the canister purge valve into an intake manifold (FIG. 3). During boosted conditions, fuel vapors from the fuel vapor canister may be purged through an ejector coupled to a bypass passage around the compressor (FIGS. 3-4). Herein, the fuel vapors may be delivered to an inlet of the compressor and thereon into the intake manifold. A shut-off valve coupled in the compressor bypass passage may be adjusted to enable motive flow through the ejector, thus producing suction and inducing air to flow through the canister and into the ejector (FIGS. 3-4).

Figure 5:
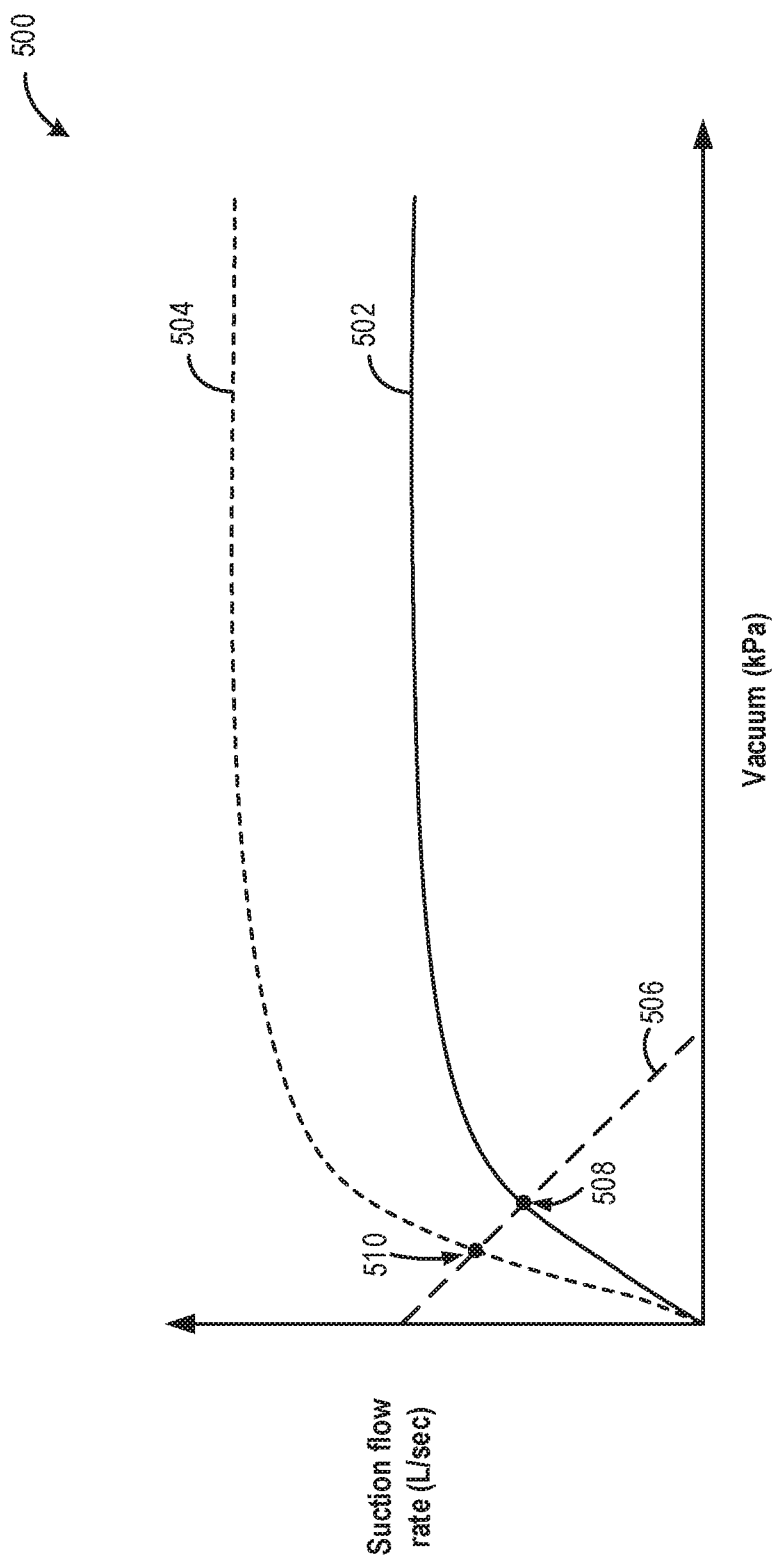
FIG. 5 presents a graph showing a comparison between flow rates through an ejector when the ejector is coupled to downstream of a canister purge valve, and when the ejector bypasses the purge valve through a bypass valve.
Figure 6:
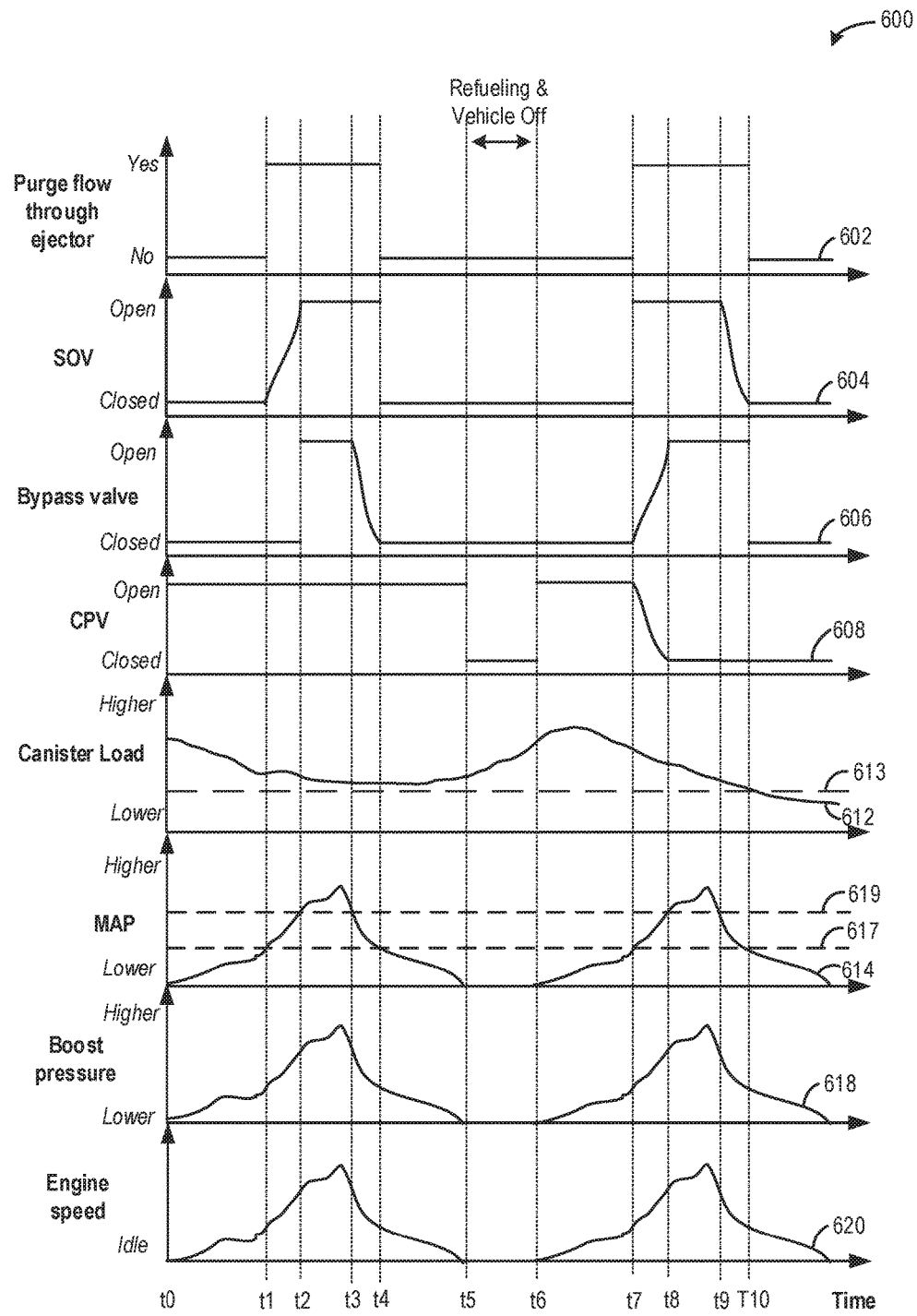
FIG. 6 is a graph depicting example purging operations in an engine system.

During the boosted conditions, a position of the shut-off valve may be adjusted to regulate the amount of purge flow from the fuel vapor canister through the ejector, to the inlet of the compressor (FIGS. 3 and 6). Example purge operations are depicted in FIG. 6. Further, purge gasses flowing to the ejector from the fuel vapor canister, may follow two separate flow paths, where the flow in each path may be adjusted by valves positioned in each flow path. A first purge bypass line may couple the ejector to upstream of the canister purge valve, and purge flow through the first purge bypass line may be regulated by a canister purge bypass valve positioned in the first purge bypass line. By coupling the ejector to upstream of the canister purge valve, an increased purge flow rate may be attained via the ejector (FIG. 5).

Referring now to FIG. 1, it shows aspects of an example engine system 100 which may be included in an automotive vehicle. The engine system is configured for combusting fuel vapor accumulated in at least one component thereof. Engine system 100 includes a multi-cylinder internal combustion engine, generally depicted at 102, which may propel the automotive vehicle. Engine 102 may be controlled at least partially by a control system including a controller 112 and by input from a vehicle operator 130 via an input device 132. In this example, input device 132 includes an accelerator pedal and a pedal position sensor 134 for generating a proportional pedal position signal PP.

Engine 102 includes an intake throttle 165 fluidly coupled to an intake manifold 144 along an intake passage 142. Air may enter intake passage 142 from an air intake system (AIS) including an air cleaner 133 in communication with the vehicle's environment. Intake throttle 165 may include throttle plate 192. In this particular example, the position of throttle plate 192 may be varied by controller 112 via a signal provided to an electric motor or actuator included with intake throttle 165, a configuration that is commonly referred to as electronic throttle control (ETC). In this manner, intake throttle 165 may be operated to vary the intake air provided to intake manifold 144 and the plurality of cylinders therein.

A barometric pressure sensor 196 may be coupled at an inlet of intake passage 142 for providing a signal regarding barometric pressure (BP). A manifold air pressure sensor 162 may be coupled to intake manifold 144 for providing a signal regarding manifold air pressure (MAP) to controller 112. A throttle inlet pressure sensor 161 may be coupled immediately upstream of intake throttle 165 for providing a signal regarding throttle inlet pressure (TIP) or boost pressure.

Intake manifold 144 is configured to supply intake air or an air-fuel mixture to a plurality of combustion chambers 30 (also termed, cylinders 30) of engine 102. The combustion chambers 30 may be arranged above a lubricant-filled crankcase (not shown), in which reciprocating pistons of the combustion chambers rotate a crankshaft (not shown). Combustion chambers 30 may be supplied one or more fuels via fuel injectors 66. Fuels may include gasoline, alcohol fuel blends, diesel, biodiesel, compressed natural gas, etc. Fuel may be supplied to the combustion chambers via direct injection (as shown in FIG. 1), port injection, throttle valve-body injection, or any combination thereof. It will be noted that a single fuel injector 66 is depicted in FIG. 1 and though not shown, each combustion chamber 30 may be coupled with a respective fuel injector 66. In the combustion chambers, combustion may be initiated via spark ignition and/or compression ignition. Further, exhaust gases from combustion chambers 30 may exit engine 102 via an exhaust manifold (not shown) into an emission control device (not shown) coupled to an exhaust passage (not shown).

Engine system 100 may further include a compressor 114 for providing a boosted intake air charge to intake manifold 144. In the example of a turbocharger compressor, compressor 114 may be mechanically coupled to and driven by an exhaust turbine (not shown) powered by exhaust gases flowing from the engine. The exhaust turbine may be positioned in the exhaust passage and may be driven by exhaust gases. A wastegate (not shown) may be coupled across the exhaust turbine of the turbocharger. Specifically, the wastegate may be included in a bypass passage coupled between an inlet and outlet of the exhaust turbine. By adjusting a position of the wastegate, an amount of boost provided by the exhaust turbine may be controlled.

Alternatively, compressor 114 may be any suitable intake-air compressor, such as a motor-driven supercharger compressor.

In the configuration illustrated in FIG. 1, compressor 114 draws fresh air from air cleaner 133 and flows compressed air through intercooler 143. The intercooler may also be termed a charge air cooler. As such, each of compressor 114 and intercooler 143 are positioned upstream of intake throttle 165. The intercooler 143 cools the compressed air, which then flows via intake throttle 165 to intake manifold 144, depending on the position of throttle plate 192 of intake throttle 165. A compressor inlet pressure sensor 160 is coupled immediately upstream of the compressor 114 for providing a signal regarding compressor inlet pressure (CIP) to controller 112.

One or more bypass passages may be coupled across compressor 114 to divert a portion of intake air compressed by compressor 114 back upstream of the compressor into the compressor inlet. The one or more bypass passages may include a first passage 186 and a second passage 191. Additionally or alternatively, the one or more bypass passages may include an ejector 180, positioned as shown in FIG. 1. Ejectors, may provide low-cost vacuum generation when utilized in engine systems, and in some examples may be passive devices. As such, ejector 180 may be an ejector, an eductor, a venturi, a jet pump, or similar passive device. Thus, in the description herein, ejectors may alternatively be referred to as aspirators, venturi pumps, jet pumps, and eductors.

As depicted in the example of FIG. 1, a first end 145 of first passage 186 may be coupled to intake passage 142 downstream of air cleaner 133 and upstream of compressor 114. A second end 147 of first passage 186 may be coupled with second passage 191 via ejector 180. As such, second end 147 of first passage 186 may be coupled to a motive outlet of ejector 180. In other words, the motive outlet of ejector 180 may be coupled to intake passage 142 upstream of compressor 114 and upstream of CIP sensor 160 via first passage 186. Therefore, motive flow of compressed air from downstream of the compressor 114 mixed with other fluids that may be drawn into the ejector via suction may be streamed into intake passage 142 at a location upstream of the compressor and downstream of air cleaner 133 (e.g., at first end 145).

Further, a first end 151 of second passage 191 may fluidically communicate with intake passage 142 downstream of compressor 114, downstream of intercooler 143, and upstream of intake throttle 165. A second end 149 of second passage 191 may be coupled to a motive inlet of ejector 180 and therethrough to first passage 186. Thus, the motive inlet of ejector 180 may fluidically communicate with intake passage 142 at a point that is downstream of compressor 114, downstream of intercooler 143, and upstream of intake throttle 165. In alternative embodiments, the motive inlet of ejector 180 may be fluidically coupled to the intake passage 142 downstream of compressor 114 but upstream of intercooler 143.

An amount of air diverted through the bypass passage formed by first passage 186 and second passage 191 may depend upon relative pressures within the engine system. Alternatively, as shown in the depicted embodiment, a shut-off valve 185 may be included in second passage 191 between first end 151 and second end 149 to regulate the flow of compressed air into the compressor bypass passage.

As shown, shut-off valve (SOV) 185 is positioned upstream (relative to the flow of compressed air in the compressor bypass passage) of ejector 180. To elaborate, SOV 185 is located in the compressor bypass passage at a position that is upstream of the motive inlet of ejector 180, the motive inlet of ejector 180 coupled to second end 149 of second passage 191. No other components are placed between the ejector and SOV 185. Herein, a position of shut-off valve 185 may regulate the amount of air flowing through the bypass passage. By controlling shut-off valve 185, and varying an amount of air diverted through the bypass passage, a boost pressure provided downstream of the compressor can be regulated. This enables boost control and also controls compressor surge.

Further, when air is diverted through passages 186 and 191, vacuum may be generated at ejector 180 for a variety of purposes including drawing fuel vapors from a canister via a canister purge valve, applying vacuum to a vacuum consumption device such as a brake booster, or for storage in a vacuum reservoir. Shut-off valve 185 may be a solenoid valve which is actuated electrically, and the state of shut-off valve 185 may be controlled by controller 112 based on various engine operating conditions. However, as an alternative, shut-off valve 185 may be a pneumatic (e.g., vacuum-actuated) valve; in this case, the actuating vacuum for shut-off valve 185 may be sourced from the intake manifold and/or a vacuum reservoir and/or other low pressure sinks of the engine system. In embodiments where the shut-off valve is a pneumatically-controlled valve, control of the shut-off valve may be performed independent of a powertrain control module (e.g., shut-off valve 185 may be passively controlled based on pressure/vacuum levels within the engine system).

SOV 185 may be a binary on/off valve or may be a continuously variable valve capable of assuming positions between fully-closed and fully-open. Thus, in examples, where SOV 185 is a binary valve, the SOV 185 may be adjusted to either a fully open position, or a fully closed position. However, in some embodiments, SOV 185 may be a continuously variable valve and may be adjusted to any position between a closed first position and an open second position. Said another way, an opening formed between an edge of the SOV 185 an interior walls of passage 191 may increase with increasing deflection away from the closed first position towards the open second position.

In one example, the position of shut-off valve 185 may be adjusted based on intake manifold pressure. In another example, the position of shut-off valve 185 may be adjusted based on a desired engine air flow amount and/or rate. In another examples, the position of the SOV 185 may be adjusted based on a canister load (e.g., loading of canister 122). In yet another example, the position of shut-off valve 185 may be based upon a desired boost level. It will be appreciated that references to adjustment of shut-off valve 185 may refer to either active control via controller 112 (e.g., as in an where shut-off valve 185 is a solenoid valve) or passive control based on a vacuum actuation threshold of the shut-off valve (e.g., in embodiments where shut-off valve 185 is a vacuum-actuated valve). By varying the motive flow through ejector 180 via adjustment of the state of shut-off valve 185, an amount of vacuum drawn at the entraining inlet of ejector 180 may be modulated to meet vacuum requirements.

Engine system 100 further includes fuel system 40 comprising fuel tank 126, fuel vapor canister 122, and other components which will be described further below. Fuel tank 126 stores a volatile liquid fuel that may be delivered via fuel injector 66 to combustion chambers 30 in engine 102. To avoid emission of fuel vapors from the fuel tank 126 into the atmosphere, the fuel tank 126 is vented to the atmosphere through fuel vapor canister 122. Fuel vapor canister may also be referred to as an adsorbent canister, a fuel system canister, a charcoal canister, or simply, a canister, in the rest of this description. Fuel vapor canister 122 may have a significant capacity for storing hydrocarbon-, alcohol-, and/or ester-based fuels in an adsorbed state. The adsorbent canister may be filled with activated carbon granules and/or another high surface-area material, for example, to adsorb fuel vapors received from the fuel tank. Nevertheless, prolonged adsorption of fuel vapor will eventually reduce the capacity of the adsorbent canister for further storage and may result in bleed emissions. Therefore, the adsorbent canister may be periodically purged of adsorbed fuel vapors, as further described hereinafter. While a single fuel vapor canister 122 is shown in FIG. 1, it will be appreciated that any number of canisters may be coupled in engine system 100.

A vapor blocking valve (VBV) 124 (also termed, fuel tank isolation valve 124) may be optionally included in a conduit between fuel tank 126 and fuel vapor canister 122. In some embodiments, VBV 124 may be a solenoid valve, and operation of VBV 124 may be regulated by adjusting a driving signal (or pulse width) of the dedicated solenoid. In some examples, the VBV 124 may include an intentional leak, where the intentional leak may be a bypass line that may be in parallel to the VBV 124. During normal engine operation, VBV 124 may be kept closed to limit the amount of diurnal vapors directed to canister 122 from fuel tank 126. During refueling operations, and selected purging conditions, VBV 124 may be opened to direct fuel vapors from the fuel tank 126 to canister 122. By opening the fuel tank isolation valve (FTIV) 124 during conditions when the fuel tank pressure is higher than a threshold pressure (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the FTIV may be mounted on fuel tank 126.

One or more pressure sensors 128 may be coupled to fuel tank 126 for estimating a fuel tank pressure or vacuum level. While the depicted example shows a pressure sensor coupled to fuel tank 126, in alternate embodiments, pressure sensor 128 may be coupled between the fuel tank and VBV 124.

Fuel vapors released from canister 122 during a purging operation may be directed into intake manifold 144 via purge conduit 119. The flow of vapors along purge conduit 119 may be regulated by canister purge valve 164, coupled between the fuel system canister and the engine intake. The quantity and rate of vapors released by the canister purge valve may be determined by the duty cycle of an associated canister purge valve solenoid (not depicted). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve 152 may be included in purge conduit 119 to prevent intake manifold pressure from flowing gases in the opposite direction of the purge flow. As such, the optional canister check valve may be included if the canister purge valve control is not accurately timed or the canister purge valve itself can be forced open by a high intake manifold pressure. An estimate of the manifold airflow (MAF) may be obtained from a MAF sensor (not shown) coupled to intake manifold 144, and communicated with controller 112. Alternatively, MAF may be inferred from alternate engine operating conditions, such as mass air pressure (MAP), as measured by a MAP sensor 162 coupled to the intake manifold.

In the configuration shown in FIG. 1, canister purge valve 164 is a two-port canister-purge valve (CPV) that controls the purging of fuel vapors from the canister into the intake manifold, along each of the purge conduit 119 and second purge bypass conduit 123. Purge conduit 119 fluidically couples CPV 164 to intake manifold 144. Second purge bypass conduit 123 fluidically couples CPV 164 to ejector 180 and thereon, to intake passage 142 upstream of compressor 114. Second purge bypass conduit 123 is fluidically coupled to an entraining inlet 194 of ejector 180 via second check valve 150. Entraining inlet 194 of ejector 180 may also be termed suction port 194 of ejector 180.

CPV 164, which is depicted schematically in FIG. 1, comprises a solenoid valve 172 and a flow restriction 174. In the depicted example, flow restriction 174 may be a sonic choke 174. It will be noted that the solenoid valve 172 and the sonic choke 174 may be positioned within a single, common housing of CPV 164. In other words, solenoid valve 172 and sonic choke 174 may be located within the same housing of the CPV 164. It will also be noted that sonic choke 174 is positioned proximate to solenoid valve 172 within CPV 164. It may be further noted that the CPV may include valves other than solenoid valves and flow restrictions other than sonic chokes without departing from the scope of the present disclosure. Sonic choke 174 may also be termed sonic nozzle 174.

As depicted in FIG. 1, flow restriction 174 (or sonic choke 174) is positioned in series with solenoid valve 172 such that an inlet of sonic choke 174 fluidically communicates with an outlet of solenoid valve 172. An outlet of sonic choke 174 is fluidically coupled to intake manifold 144 via purge conduit 119, which may comprise a first check valve 152. A sonic choke is a special kind of flow restriction that results in a substantially fixed flow rate for a vacuum deeper than 15-20 kPa. The sonic choke has an ability of pressure recovery that makes it different from an orifice without pressure recovery. Without pressure recovery, choked flow may occur at vacuum deeper than 48 kPa, assuming an upstream pressure is 100 kPa.

The sonic choke restriction may enable a more accurate metering of flow rate. Purged vapors exiting the outlet of solenoid valve 172 encounter flow restriction 174 of CPV 164 before flowing directly into intake manifold 144. Alternatively, the purge vapors may flow to ejector 180 after exiting the CPV 164 via second purge bypass conduit 123. By positioning the sonic choke 174 downstream of solenoid valve 172, purge flow may be regulated and metered into the intake manifold 144 at a steady flow rate. Further, fuel injection via fuel injectors may be adjusted more accurately if purged fuel vapors enter the intake manifold at a steady flow rate allowing enhanced control of air-fuel ratio, emissions, and engine performance. A first check valve 152 coupled in purge conduit 119 prevents backflow from intake manifold 144 into canister 122, and allows fluid flow only from CPV 164 along conduit 119 towards intake manifold 144. As depicted, first check valve 152 may be positioned in purge conduit 119 downstream of the outlet of sonic choke 174, between the CPV 164 and the intake manifold 144.

Opening or closing of CPV 164 is performed via actuation of solenoid valve 172 by controller 112. Specifically, a pulse width modulated (PWM) signal may be communicated to the solenoid valve 172 in CPV 164 during a canister purging operation. In one example, the PWM signal may be at a frequency of 10 Hz. In another example, the solenoid valve 172 may receive a PWM signal of 20 Hz. In yet another examples, the solenoid may be actuated synchronously.

When CPV 164 is open, depending on relative pressure levels within the engine system, purge flow may flow through the CPV 164 and then continue either into the entraining inlet 194 of ejector 180 via second purge bypass conduit 123, if SOV 185 is not closed, or into the intake manifold 144 via purge conduit 119. During certain conditions, purge flow may occur along both purge paths (e.g., purge conduit 119 and second purge bypass conduit 123) simultaneously.

A second check valve 150 may positioned in second purge bypass conduit 123 downstream of CPV 164. Purged vapors may, therefore, may flow only in the direction from CPV 164 towards entraining inlet 194 of ejector 180 and not in the opposite direction. Second check valve 150 effectually obstructs fluid flow from ejector 180 into one or more of intake manifold 144 and CPV 164. The position of second check valve 150 may be such that a volume is included between second check valve 150 and the outlet of the CPV 164.

The first purge bypass conduit 121 may fluidically couple the ejector 180 to the canister 122 upstream of the CPV 164. Specifically, a first end 127 of the first purge bypass conduit 121 may be coupled to upstream of the CPV 164, between the CPV 164 and the canister 122. A second end 129 of the bypass conduit 121 may be coupled to the second purge bypass conduit 123, downstream of the second check valve 150. However, in other examples, the second end 129 of the bypass conduit 121 may be coupled directly to the suction port 194 of ejector 180.

Thus, during engine operating conditions, where the SOV 185 is not in a closed position, gasses from the canister 122 may flow through the first purge bypass conduit 121, around the CPV 164 en route to the ejector 180. The flow of vapors along first purge bypass conduit 121 may be regulated by canister purge bypass valve (CPBV) 184, coupled in the conduit 121, between the first end 127 and second end 129 of the conduit 121. CPBV 184 may be a solenoid valve, and thus opening or closing of CPBV 184 may be performed via actuation by controller 112. Specifically, a pulse width modulated (PWM) signal may be communicated to the CPBV 184 during a canister purging operation. In one example, the PWM signal may be at a frequency of 10 Hz. In another example, the CPBV 184 may receive a PWM signal of 20 Hz. Further, the CPBV 184 may be a low-restriction valve, and may not include a sonic choke such as the sonic choke 172 included in the CPV. As such the CPBV may allow a larger amount of gasses to flow there-through than the CPV.

However, during conditions where the vacuum level at the inlet 194 of the ejector 180 is below a threshold, the CPBV may be closed. Thus, if the vacuum level at the inlet 194 of the ejector is below a threshold, where the threshold represents a vacuum level below which gasses may flow from the ejector 180 towards the canister 122, then the CPBV 184 may be closed. The CPBV 184 may be closed when vacuum levels at the ejector are below the threshold to prevent gasses from flowing to upstream of the CPV and one or more of the canister 122 and intake manifold 144, from the ejector 180 via conduit 121.

As explained above, in some examples, CPBV 184 may be a solenoid valve which is actuated electrically, and the state of CPBV 184 may be controlled by controller 112 based on various engine operating conditions. However, as an alternative, CPBV 184 may be a pneumatic (e.g., vacuum-actuated) valve; in this case, the actuating vacuum for CPBV 184 may be sourced from the intake manifold and/or a vacuum reservoir and/or other low pressure sinks of the engine system. In embodiments where the CPBV 184 is a pneumatically-controlled valve, control of the shut-off valve may be performed independent of a powertrain control module (e.g., CPBV 184 may be passively controlled based on pressure/vacuum levels within the engine system).

Whether CPBV 184 is actuated electrically or with vacuum, it may be either a binary valve (e.g., a two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable shut-off valve may provide greater flexibility in control of the purge flow through first purge bypass conduit 121, with the drawback that continuously variable valves may be much more costly than binary valves. Thus, in examples where the CPBV 184 is a continuously variable valve, the CPBV 184 may be adjusted to any position between a closed first position and an open second position, where an amount of gasses flowing through the CPBV 184 may increase with increasing deflection away from the closed first position towards the open second position. Said another way, an opening formed between an edge of the CPBV 184 and interior walls of bypass conduit 121 may increase with increasing deflection away from the closed first position towards the open second position. In other examples, CPBV 184 may be a gate valve, pivoting plate valve, poppet valve, or another suitable type of valve.

The state of CPBV 184 may be adjusted based on various engine operating conditions, to vary the motive flow through first purge bypass conduit 121. As used herein, a state of CPBV 184 may be fully open, partially open (to varying degrees), or fully closed. In one example, the state of CPBV 184 may be adjusted based on intake manifold pressure. In other examples, the state of the CPBV 184 may be adjusted based on a canister load. The canister load may be a level of fuel vapors stored in the canister 122, and may be estimated based on outputs from sensor 138 as described in greater detail below. In another example, the state of CPBV 184 may be adjusted based on a desired engine air flow amount and/or rate. In yet another example, the position of CPBV 184 may be based upon a desired boost level. In still further examples, the position of CPBV 184 may be based upon the throttle inlet pressure as estimated based on outputs from the sensor 161. It will be appreciated that references to adjustment of CPBV 184 may refer to either active control via controller 112 (e.g., as in where CPBV 184 is a solenoid valve) or passive control based on a vacuum actuation threshold of the shut-off valve (e.g., in embodiments where CPBV 184 is a vacuum-actuated valve). By varying the motive flow through first purge bypass conduit 121 via adjustment of the state of CPBV 184, an amount of purge gasses drawn from upstream of the CPV 164 to the entraining inlet of ejector 180 may be modulated so long as the SOV 185 is not in a closed position, and vacuum is being drawn at the inlet 194 of the ejector 180.

Further, as discussed in greater detail below with reference to FIG. 3, during certain engine conditions, such as when manifold air pressure exceeds a threshold, CPV valve 164 may be closed, and purge gasses may flow only from the canister 122, to the ejector 180 through first purge bypass conduit 121, and not through purge conduit 119 or second purge bypass conduit 123.

Fuel system 40 may be operated by controller 112 in a plurality of modes by selective adjustment of the various valves and solenoids. For example, the fuel system may be operated in a fuel vapor storage mode wherein the controller 112 may close CPV 164 and open canister vent valve 120 and FTIV 124 to direct refueling and diurnal vapors into canister 122 while preventing fuel vapors from being directed into the intake manifold. In this mode, air stripped of fuel vapors may be streamed from canister 122 to the atmosphere through canister vent valve 120 and vent 117.

As another example, the fuel system may be operated in a refueling mode (e.g., when fuel tank refueling is requested by a vehicle operator), wherein the controller 112 may adjust the valves to depressurize the fuel tank before enabling fuel to be added therein. Therein the controller 112 may open canister vent valve (CVV) 120 and open each of CPV 164 and FTIV 124 to direct excess fuel tank pressure/vacuum into the intake manifold via the canister.

As yet another example, the fuel system may be operated in a canister purging mode (e.g., when canister is saturated, an emission control device has attained light-off temperature, and with the engine running), wherein the controller 112 may open CPV 164, CVV 120, and close FTIV 124. By closing the FTIV, the canister can be purged more efficiently. During this mode, vacuum generated either by the intake manifold or by the ejector may be used to draw fresh air through vent 117 and through fuel system canister 122 to purge the stored fuel vapors into intake manifold 144. In this mode, the purged fuel vapors from the canister, along with air drawn from the atmosphere to enable purging, are combusted in the engine. The purging may be continued until an amount of stored fuel vapors in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister. Alternatively, in one example, one or more sensors 138 may be coupled to the canister 122 to provide an estimate of a canister load (that is, an amount of fuel vapors stored in the canister). As an example, sensor 138 may be a pressure sensor providing an estimate of canister pressure or canister load. In another example, the fuel system canister load may be based on the number and duration of refueling events that have occurred following a previous canister purging event. Based on the canister load, and further based on engine operating conditions, such as engine speed-load conditions, a purge flow rate may be determined. While sensor 138 is shown directly coupled to the canister in FIG. 1, other embodiments may position sensor 138 downstream of the canister, or in other locations, without departing from the scope of the present disclosure. For example, the sensor 138 may be coupled in-between the fuel tank and VBV 124.

During one or more purging modes, vapors stored in fuel vapor canister 122 may be purged to intake manifold 144 by opening one or more of solenoid valve 172 of CPV 164, SOV 185, and CPBV 184. For example, as detailed earlier, vapors may be purged directly to intake manifold 144 via purge conduit 119, or indirectly to intake manifold 144 via one or more of the first purge bypass conduit 121 and second purge bypass conduit 123. Purging along the first purge bypass conduit 121 and second purge bypass conduit 123 into intake manifold 144 may occur after entering the entraining inlet 194 of ejector 180 and then flowing in first passage 186 to intake passage 142 which ultimately leads to intake manifold 144. As will be detailed below, the path taken by vapors purged from the canister may depend upon a state of the shut-off valve 185, when present, as well as on relative pressures within engine system 100. Thus, the amount of vacuum generated at ejector 180, and therefore an amount of gasses flowing from the canister 122 to the ejector 180 may increase with increasing deflection of the SOV away from the closed first position towards the open second position.

Motive flow through ejector 180 generates a suction flow at the entraining inlet 194 of ejector 180, thereby generating vacuum which may be used to draw purged fuel vapors via CPV 164 and/or CPBV 184. Suction port 194 may be located at a neck of ejector 180, and therefore, vacuum may be drawn at the neck of the ejector 180. As such, ejector 180 is a three-port device, coupled to the compressor bypass passage, including a motive inlet port, a mixed flow or motive outlet port, and an entraining inlet port. As mentioned earlier, suction port 194 of ejector 180 fluidically communicates with downstream of CPV 164 via second purge bypass conduit 123, and upstream of CPV 164 via first purge bypass conduit. Thus, ejector 180 is fluidically coupled to both upstream and downstream of CPV 164. Motive inlet of ejector 180 may be fluidically coupled to second end 149 of second passage 191, and may receive compressed air from downstream of compressor 114. As such, motive inlet of ejector 180 may be fluidically coupled to intake passage 142 at a location downstream of compressor 114, and in some embodiments, may also be coupled downstream of intercooler 143. Motive outlet of ejector 180 may be fluidically coupled to second end 147 of first passage 186. Thus, motive outlet of ejector 180 may fluidically communicate with intake passage 142 via first passage 186 at a location upstream of compressor 114. During conditions when motive flow passes through ejector 180, a mixture of the fluid flow from the motive inlet and the entraining inlet 194, referred to herein as mixed flow, exits the mixed flow outlet. In one example, mixed flow exiting the mixed flow outlet may be a combination of compressed air and purged fuel vapors.

It will be appreciated that in some embodiments, first check valve 152 may not be included in purge conduit 119 when shut-off valve 185 is present. When first check valve 152 is not included in purge conduit 119, during boosted conditions and with shut-off valve 185 at least partially open to generate a vacuum via ejector 180, boosted air may flow in a reverse direction through purge conduit 119 towards CPV 164. Herein, even if solenoid valve 172 is opened, the boosted air may preferentially leak towards suction port 194 of ejector 180 relative to flowing towards fuel vapor canister 122. Further, during boosted conditions, manifold pressure may be lower than throttle inlet pressure such that by maintaining shut-off valve in at least a slightly open position, ejector 180 may continue to generate a vacuum to draw any reverse flow from intake manifold 144 away from canister 122. In cases when ejector driving pressure is lower, manifold pressure will be likewise lower reducing reverse flow into CPV 164. Further still, in some examples, reverse flow through sonic choke 174 may be substantially lower than forward flow through sonic choke 174 because of a lower discharge coefficient.

It will also be appreciated that vacuum generated by ejector 180 may be used for additional purposes other than drawing purge flow, without departing from the scope of this disclosure. For example, ejector generated vacuum may be stored in a vacuum reservoir. In another example, vacuum from the ejector may be used in a brake booster.

Controller 112 may be configured as a microcomputer including a microprocessor unit, input/output ports, an electronic storage medium for executable programs and calibration values, random access memory, keep alive memory, and a data bus. Controller 112 may receive various signals from sensors 116 coupled to engine 102 such as BP sensor 196, MAP sensor 162, CIP sensor 160, TIP sensor 161, etc. Furthermore, controller 112 may monitor and adjust the position of various actuators 118 based on input received from the various sensors 116. These actuators may include, for example, intake throttle 165, intake and exhaust valve systems, solenoid valve 172 of CPV 164, canister vent valve 120, FTIV 124, shut-off valve 185, and CPBV 184. Storage medium read-only memory in controller 112 can be programmed with computer readable data representing instructions executable by a processor for performing the routines described below, as well as other variants that are anticipated but not specifically listed. Example routines are described herein with reference to FIGS. 3 and 4.

In this way, an engine system may comprise: an engine including an intake, a compressor coupled to the intake for providing a boosted aircharge to the engine, a compressor bypass for recirculating boosted aircharge from downstream of a compressor outlet to a compressor inlet, an ejector coupled in the compressor bypass, a fuel system including a fuel tank coupled to a canister, a purge line coupling the canister to the intake via a purge valve, a first purge bypass coupling a suction port of the ejector to the purge line at a location upstream of the purge valve, the first purge bypass including a bypass valve, a second purge bypass coupling the suction port of the ejector to the purge line at a location downstream of the purge valve, the second purge bypass including a check valve, the second purge bypass coupled to the first purge bypass downstream of the bypass valve, and a controller with computer readable instructions. The computer readable instruction may include instructions for: during boosted engine operation, recirculating boosted aircharge through the ejector, and based on boost pressure and canister load, varying a ratio of ejector vacuum applied on the canister via the first purge bypass relative to the second purge bypass.

The varying of the ratio may include increasing the ratio of ejector vacuum applied on the canister via the first purge bypass relative to the second purge bypass as boost pressure increases or canister load increases. Additionally, the intake may further include a throttle coupled downstream of the compressor, and wherein the controller includes further instructions for, during the varying, adjusting an opening of the intake throttle based on the boost pressure and the canister load. In other examples, the varying the ratio may include adjusting one or more of an opening of the bypass valve and an opening of an ejector shut-off valve coupled in the compressor bypass, upstream of a motive inlet of the ejector.

Turning now to FIG. 2A, it shows aspects of another example engine system 200 which may be included in an automotive vehicle. Engine system 200 is identical to engine system 100 except that engine system 200 includes a third check valve 153 in the second purge bypass conduit 123. As such components in the engine system 200 are the same as those previously introduced in engine system 100 shown in FIG. 1. Components in engine system 200 previously introduced in FIG. 1, may not be reintroduced, or discussed in the description of FIG. 2A.

A third check valve 153 may be positioned in second purge bypass conduit 123, downstream of where the second end 129 of first purge bypass conduit 121 is coupled to the second purge bypass conduit 123. Thus, third check valve 153 may be positioned between ejector 180 and portion of the second purge bypass conduit 123 where the first purge bypass conduit 121 is coupled to the second purge bypass conduit 123. In examples, where the first purge bypass conduit is coupled directly to the ejector 180, third check valve 153 may not be included in engine system 200.

Third check valve 153 may prevent gasses and/or fluids from flowing through the ejector 180, through first purge bypass conduit 121 and CPBV 184. As such, check valve 153 may prevent gasses and/or fluids from flowing through either passage 191 or 186, or both to upstream of the CPV 164. In this way, when the CPBV 184 is open, check valve 153 may prevent gasses and/or fluids from flowing from ejector 180 through CPBV 184 to one or more of the canister 122 and intake manifold 144 if the CPV 164 is also open. As such, CPBV 184 may in some examples, remain open under all engine operating conditions, except where canister loading may exceed a threshold which may result in excess fuel vapors being purged to upstream of the compressor 114 and subsequently to intake manifold 144. Thus, CPBV 184 may only be closed, if opening the CPBV 184 would result in fuel vapors being purged to the ejector 180 to exceed a threshold. In some examples, the threshold may be 60% of a desired fuel injection amount, where the fuel injection amount may be based on a torque demand, and a desired air/fuel ratio.

Turning now to FIG. 2B, it shows aspects of another example engine system 250 which may be included in an automotive vehicle. Engine system 250 is identical to engine system 100 except that engine system 250 may not include check valve 150 shown in FIG. 1 in the second purge bypass conduit 123. As such components in the engine system 250 are the same as those previously introduced in engine system 100 shown in FIG. 1. Components in engine system 250 previously introduced in FIG. 1, may not be reintroduced, or discussed in the description of FIG. 2B.

In the engine system 250, depending on the pressure in the intake manifold 144, upon opening of the CPBV 184, gasses flowing through the CPBV 184 may flow to the intake manifold 144. Thus, whereas in FIG. 1, a check valve (e.g., check valve 150 shown in FIG. 1) is included in the flow path between CPBV 184 and intake manifold 144, which prevents gasses flowing through the CPBV 184 to flow to the intake manifold 144, in the engine system 250, CPBV 184 may be opened to allow gasses to flow from the canister 122 to the intake manifold 144. In the engine system 250, both the CPBV 184 and the CPV 164 may be adjusted based on a vacuum level at the inlet 194 of the ejector 180. Thus, if the vacuum level at the inlet 194 of the ejector is below a threshold, where the threshold represents a vacuum level below which gasses may flow from the ejector 180 towards the canister 122, then the CPBV 184 and CPV may be closed. The vacuum generated at the ejector is based on the boost level (difference between throttle inlet pressure and compressor inlet pressure) and the position of the SOV. Thus, vacuum generation may increase for increases in boost level and adjusting of the SOV to a more open position. As such, the CPBV 184 and CPV 164 may be adjusted based on the boost level, and may be closed when the boost level decreases below a threshold which may cause gasses to flow from the ejector 180 towards one or more of the CPBV 184, CPV 164, and intake manifold 144 along conduit 123.

Put more simply, CPV 164 may be opened during boosted conditions where the pressure difference between the CPV 164 and ejector 180 is such that flow between CPV 164 and ejector 180 is in a direction away from the CPV 164, towards the ejector 180. Additionally, during such boosted conditions, CPBV 184 may be opened to increase a flow of gasses from the canister 122 towards one or more of the ejector 180 and intake manifold 144. Thus, if CPV 164 is open, and the purge flow from the canister 122 is less than desired, the CPBV 184 may be opened to increase purge flow from the canister 122 to one or more of the ejector 180 and intake manifold 144, and ejector 180.

Turning now to FIG. 3, it depicts an example routine 300 for performing canister purging based on boost levels and manifold air pressure (MAP) in an engine system, such as engine system 100 shown in FIG. 1. Specifically, during non-boosted conditions, purged fuel vapors may be directed into the intake manifold via a canister purge valve (e.g., CPV 164 shown in FIG. 1). During boosted conditions, depending on intake manifold pressure relative to boost pressure, purged fuel vapors may be directed into an inlet of the compressor, and/or into the intake manifold. Further, purged fuel vapors flowing to the inlet of the compressor may be directed through and/or around the canister purge valve. Routine 300 and all other routines described therein, such as routine 400, may be executed by a controller (e.g., 112 shown in FIG. 1). As such, the routines 300 and 400, may be stored in non-transitory memory on the controller, and may be executed based on signals received from various engine sensors (e.g., sensors 161 and 162 shown in FIG. 1).

Routine 300 begins at 302, where engine operating parameters such as torque demand, engine speed, barometric pressure (BP), MAP, air-fuel ratio, etc. may be estimated and/or measured. For example, manifold pressure may be sensed via a manifold pressure sensor (e.g., sensor 162 in FIG. 1). Boost levels may be estimated based on outputs from a throttle inlet pressure sensor (e.g., TIP sensor 161 shown in FIG. 1). Further, air-fuel ratio may be measured based on an output of an exhaust sensor coupled to the exhaust manifold in the engine.

At 304, routine 300 may determine if purging conditions are met. Purging conditions may be confirmed based on various engine and vehicle operating parameters, including an amount of hydrocarbons stored in a fuel vapor canister (e.g., canister 122 shown in FIG. 1) being greater than a threshold, the temperature of an emission catalyst being greater than a threshold, fuel temperature, the number of engine starts since the last purge operation (such as the number of starts being greater than a threshold), a duration (e.g., amount of time, number of engine cycles, distance traveled, etc.) elapsed since the last purge operation, fuel properties, and various others. An amount of fuel vapors stored in the fuel system canister may be measured based on one or more sensors in the emission control system (e.g., sensor 138 coupled to fuel vapor canister 122 of FIG. 1) or estimated based on a learned vapor amount/concentration at the end of a previous purging cycle. The amount of fuel vapors stored in the fuel system canister may be further estimated based on engine and vehicle operating conditions including a frequency of refueling events and/or frequency and duration of previous purging cycles. If purging conditions are not confirmed and not met, routine 300 progresses to 306 to not perform the purging routine, and routine 300 ends. In alternative embodiments, a purging routine may be initiated by the controller based on existing engine conditions. For example, if the emission treatment device has achieved light-off, purging may be initiated even when canister load is less than the threshold load to further reduce stored hydrocarbon levels.

If purging conditions are met at 304, routine 300 continues to 308 to determine whether manifold vacuum is greater than an upper first threshold. As explained above, the manifold vacuum may be estimated based on outputs from the manifold pressure sensor. The upper first threshold may represent non-boosted engine conditions, where boost levels are lower than a threshold, such as engine idling conditions. During conditions where the manifold vacuum is greater than the upper first threshold, (e.g., during non-boosted conditions), there may be sufficient manifold vacuum to draw purged fuel vapors through a purge conduit (e.g., purge conduit 119 shown in FIG. 1) from downstream of the canister purge valve. Thus, vacuum level above the upper first threshold may represent non-boosted engine operating conditions, whereas vacuum level below the first threshold may represent boosted engine operating conditions.

Thus, if it is determined at 308 that the manifold vacuum is greater than the upper first threshold, then routine 300 proceeds to 310 to adjust position of various valves for purge flow. Accordingly, the CPV (e.g., CPV 164 of FIG. 1) may be opened at 312. In some examples, the shut-off valve in the compressor bypass passage (e.g., SOV 185) may also be closed at 316 during non-boosted conditions so that purge gasses may only flow from the canister through the CPV to the intake manifold directly along the purge conduit, and not through an ejector (e.g., ejector 180 shown in FIG. 1). However, in some embodiments, the shut-off valve may not be closed, so that some purged gasses may also flow through the ejector, in addition to flowing directly to the intake manifold along the purge conduit. Further, a CPBV (e.g., CPBV 184 shown in FIG. 1) may be closed at 314, so that purge gasses do not flow around the CPV through a first purge bypass conduit (e.g., first purge bypass conduit 121 shown in FIG. 1). However, in some embodiments, the CPBV may not be closed, so that purge gasses may flow from the canister around the CPV. Specifically, in examples, where a check valve (e.g., check valve 150 shown in FIGS. 1, 2A) is not positioned between the CPBV and the intake manifold, the CPBV may be adjusted to an open position at 310, so that purge gasses from the canister may flow through the CPBV en route to the intake manifold.

Opening of CPV may include communicating a pulse width modulated signal to a solenoid valve (e.g., solenoid valve 172 shown in FIG. 1) which may be pulsed in an open/closed mode. Further, the opening and closing of the solenoid valve may be synchronized with engine cylinder combustion events. As will be noted, the solenoid valve in the CPV can be visualized as a gaseous fuel injector which injects fuel vapors (from a canister) along with air (from atmosphere to enable purging) into the engine intake.

As described above, in examples where the CPV is a binary valve, the position of the CPV may be to either a closed first position, where purge gasses do not flow through the CPV, or an open second position where purge gasses flow through the CPV. However, in other examples, where the CPV is a continuously variable valve, the CPV may be adjusted to any position between the closed first position and the open second position. The amount of purge gasses flowing through the CPV, may depend both on the position of the CPV, and the pressure differential between the canister, and either the intake manifold or the ejector. Thus, if pressure difference between the canister and the intake manifold and/or the canister and the ejector is constant, the amount of gasses flowing through the CPV valve may increase with increasing deflection of the CPV away from the closed first position towards the open second position.

With the opening of the CPV, fuel vapors may flow (with air) from the fuel vapor canister through the purge conduit, via the solenoid valve, sonic choke (e.g., sonic choke 174 shown in FIG. 1), past a first check valve (e.g., first check valve 152 shown in FIG. 1), if present), in purge conduit into intake manifold 144 of engine system 100. The sonic choke may enable flow metering under conditions when the intake manifold has at least 8 kPa of vacuum.

Adjusting of the CPBV and SOV may be similar to that of the adjusting of the CPV. Thus, the CPBV and SOV may be adjusted between respective closed first position where gasses do not flow through the valves, and one or more open positions where gasses do flow through the valves. In the closed first position, the SOV may restrict the flow of boosted gasses, such that boosted gasses do not flow from downstream of a compressor (e.g., compressor 114 shown in FIG. 1) to upstream of the compressor through the ejector. As such, vacuum may not be generated by the ejector when the SOV is adjusted to the closed first position. When the CPBV is adjusted to the closed first position, purge gasses may not flow around the CPV. Thus, if the CPV is not closed, and the CPBV is closed, then purge gasses may only flow through the CPV. Conversely, if the CPV is closed, and the CPBV is open, then purge gasses may only flow through the CPBV and not the CPV.

Thus, routine 300 may continue from 310 to 318, and intake manifold vacuum may be utilized to draw air through the canister to allow desorption and purging of stored fuel vapors in the canister. Further, the intake vacuum may draw these desorbed and purged fuel vapors from the canister through the CPV at 320. Flow of purged vapors through the CPV includes flowing the purged vapors through the sonic choke, at 322.

As depicted in FIG. 1, the sonic choke is positioned downstream of the solenoid valve. Therefore, purged vapors may flow first through the solenoid valve and later through the sonic choke. Vapors flowing through the sonic choke may flow past the first check valve (if present) and then may stream into the intake manifold. Thus, at 324, purged vapors may be received from the CPV in the intake manifold downstream of the intake throttle (e.g., intake throttle 165). Further, these purged vapors may be delivered into combustion chambers for combustion. As such, during non-boosted conditions, where the SOV is adjusted to the closed first position as at 316, there may be no purge flow through the ejector since no vacuum may be generated therein.

Based on an amount of fuel vapors received in the manifold from the canister, engine fueling by fuel injectors may be adjusted. Accordingly, at 326, fuel injection timing and/or fuel injection amount may be modified based on the quantity of purged fuel vapors received from the canister in the intake manifold. In one example, the fuel injection amount and/or timing may be adjusted to maintain a cylinder air-fuel ratio at or close to a desired ratio, such as stoichiometry. For example, fueling via fuel injectors may be decreased as an amount of purged fuel vapors from the fuel vapor canister increases to maintain combustion at stoichiometry. In another example, fuel injection amount and/or timing may be modified to maintain engine combustion for torque. In yet another example, one or both of fuel injection timing and fuel injection amount may be varied to maintain each of engine torque and a stoichiometric air-fuel ratio. Furthermore, a sensor may determine an air-fuel ratio of exhaust gases exiting the engine and the determined air-fuel ratio may be compared with a desired air-fuel ratio. The controller may calculate an error based on a difference between the desired air-fuel ratio and the determined air-fuel ratio. Fuel injection from fuel injectors may, accordingly, be adjusted based on the calculated error. Routine 300 then ends.

Returning now to 308, if it is determined that the manifold vacuum is not greater than the upper first threshold at 308, then routine 300 proceeds to 328 to determine if the manifold vacuum is greater than a lower second threshold. The lower second threshold, may represent a vacuum level, below which, the boost levels are greater than a threshold. Thus, the lower second threshold may include vacuum levels below which is represented one or more of a higher engine load and a super-atmospheric intake conditions.

If the manifold vacuum is greater than the lower second threshold at 328, and thus, the manifold vacuum is between the upper first threshold and the lower second threshold, then routine 300 proceeds to 330 to perform routine 400 of FIG. 4. Routine 400 will be described further below with reference to FIG. 4.

On the other hand, if it is confirmed that manifold vacuum is not greater than the second threshold, and therefore is below each of the upper first threshold and lower second threshold, then routine 300 continues to 332 where different valves may be adjusted to enable purge flow through the ejector. At 338 the position of the SOV may be adjusted based on one or more of the boost pressure, canister load, and manifold vacuum level. The position of the SOV may be adjusted with increasing deflection towards the open second position and away from the closed first position with one or more of increasing canister load, increasing boost pressure, and decreasing manifold vacuum levels. In this way, the amount of purge gasses flowing from the canister to the ejector may increase, with increasing deflection of the SOV away from the closed first position towards the open second position. However, in other examples, where the SOV is a binary valve, the SOV may be adjusted to an "on" (or open) position at 338. Thus, if the boost levels are above a threshold, and it is determined that the engine is boosted, the SOV may be opened, and gasses from the canister may be purged through the ejector to an inlet of the compressor.

Further the CPBV may opened at 336. In examples, where the CPBV is a binary valve, the CPBV may be adjusted to an "on" (or open) position at 336. However, in examples where the CPBV is a continuously variable valve, the CPBV may be adjusted between the closed first position and a fully open second position. In any position that is not the closed first position of the CPBV, gasses flow from upstream of the CPV to the ejector through the CPBV. Thus, the CPBV may be adjusted away from the closed first position to an open second position, or any position between the closed first position and the open second position so that purge gasses may flow through the CPBV.

In some examples, the CPV may be closed at 334 so that purge gasses do not flow through the CPV. Thus, in such examples, purge gasses may only flow from the canister to the ejector, and only through the first purge bypass conduit, and not through the second purge bypass conduit or the CPV. As such, purge gasses may only flow from the canister to the intake manifold via the ejector, and not through the CPV valve and/or the purge conduit. However, in other examples, the CPV may be adjusted to an open position so that a portion of the gasses flowing from the canister flow through the CPV to one or more of the ejector and/or directly to the intake manifold via the purge conduit. In examples, where the CPV is not in the closed position, and the SOV is not in the closed position, purge gasses may flow through the CPV, and through a second check valve (e.g., second check valve 152 shown in FIG. 1) en route to the ejector.

Both the CPV and the CPBV may be adjusted based on the boost level. If the boost level is less than a threshold, then the CPV and CPBV may be closed at 332 so that gasses may not flow from the ejector towards one or more of the CPV and CPBV. The threshold may represent a boost level, below which may result in gas flow from the ejector 180 towards the CPV and CPBV.

At 340, compressed air may be streamed from downstream of the compressor 114 (and in the example of FIG. 1, downstream of intercooler 143) and upstream of intake throttle 165, through the ejector 180, towards the compressor inlet. This motive flow of compressed air through the ejector generates a vacuum. At 344, vacuum may be drawn at the neck of the ejector, and at 346, applied upstream of the CPV for drawing purged vapors from the canister to the compressor inlet via the ejector.

The applied vacuum may draw purged vapors from the canister to the inlet of the compressor via the ejector. At 346, purged vapors may be streamed through the CPBV. At 348, these vapors may then flow through a third check valve (e.g., check valve 153 shown in FIG. 2A), when included, downstream of the CPBV, between the second check valve and the ejector. Further, in some examples, routine 300 may additionally or alternatively include not flowing purge vapors through the CPV. Thus, in some examples, the routine 300 may include only flowing purge vapors through the CPBV and not through the CPV, when intake manifold vacuum is less than the lower second threshold. As such, the routine 300 may include flowing vapors through the third check valve and not the second check valve.

However, in some examples, where the CPV is not closed, routine 300 may optionally include flowing a portion of vapors through the CPV en route to one or more of the ejector and intake manifold when the vacuum is less than the lower second threshold. When flowing vapors through the CPV, to the ejector, routine 300 includes flowing the vapors through the second purge bypass conduit. In some examples, flowing the vapors through the second purge bypass conduits includes flowing the purge vapors through the second check valve. Thus, in some examples, the routine 300 may include flowing purge vapors through the second and third check valves.

These desorbed vapors may be received at the compressor inlet and may then flow into the intake manifold for combustion in the cylinders of engine 102. Based on the quantity of fuel vapors received from the canister, engine fueling may be adjusted at 326. Thus, an amount of fuel injected and/or fuel injection timing may be adjusted in response to an amount of fuel vapors received from the canister. In one example, the fuel injection amount and/or timing may be adjusted to maintain a cylinder air-fuel ratio at or close to a desired ratio, such as stoichiometry. For example, fuel injection amount may be decreased in response to an increase in fuel vapors received from the canister. Routine 300 then ends.

Turning now to FIG. 4, it shows a routine 400 for regulating the flow of purge gasses from a canister (e.g., canister 122 shown in FIG. 1), when canister purging conditions are present, and manifold vacuum levels are in-between an upper first threshold and a lower second threshold. Thus, routine 400 may be run as an extension of routine 300 from 330 of routine 300.

Routine 400 begins at 402 by estimating and/or measure engine operating parameters (e.g., torque demand, engine speed, MAP, BP, TIP, etc. Throttle inlet pressure which may also be referred to herein as boost level, may be estimated based on outputs from a pressure sensor (e.g. sensor 161 shown in FIG. 1) positioned between a compressor (e.g., compressor 114 shown in FIG. 1) and a throttle (e.g., throttle 165 shown in FIG. 1).

Routine 400 continues from 402 to 404 and it is determined if the manifold vacuum is in-between the first and second thresholds (e.g., first and second threshold discussed above with reference to FIG. 3). If it is determined that the manifold vacuum level is not within the first and second thresholds, then routine 400 continues to 406 and does not continue routine 400. Routine 400 then ends.

On the other hand, if the manifold vacuum is between the first and second threshold at 404, routine 400 continues to 408 which comprises adjusting one or more of a CPV (e.g., CPV 164 shown in FIG. 1), CPBV (e.g., CPBV 184 shown in FIG. 1), and SOV (e.g., SOV 185 shown in FIG. 1) based on one or more of canister load, boost pressure, and manifold vacuum.

The position of the valves may be adjusted between respective closed first positions where gasses do not flow through the valves, and open second positions where gasses do flow through the valves. In examples, where the valves are binary valves, the vales may only be adjusted to either the closed first positions or open second positions. In some examples, where the valves are continuously variable valves, the valves may also be adjusted to one or more positions between the closed first position and the open second position. In such examples, if the pressure differential across the valves is approximately constant, then the amount of gasses flowing through the valves may increase with increasing deflection of the valves away from the closed first position towards the open second position.

As described above with reference to FIG. 3, the vacuum generation at an ejector (e.g., ejector 180) coupled across a compressor (e.g., compressor 114 shown in FIG. 1) may increase with one or more of increasing pressure differentials across the compressor (e.g., increasing boost levels) and increasing deflection of the SOV towards the open second position away from the closed first position. Thus, the amount of vacuum generated at the ejector may be adjusted by adjusting the position of the SOV.

If the SOV is not in the closed first position, and vacuum is generated at the ejector, purge vapors from the canister may be drawn to the ejector from two separate flow paths. Purge gasses may be drawn to the ejector from a first purge bypass conduit (e.g., first purge bypass conduit 121 shown in FIG. 1), and/or from a second purge bypass conduit (e.g., second purge bypass conduit 123 shown in FIG. 1). Purge gasses drawn through the second purge bypass conduit flow through the CPV, which includes a sonic choke (e.g., sonic choke 172 shown in FIG. 1). However, purge gasses drawn through the first purge bypass conduit, do not flow through the CPV, but instead flow through a CPBV, which does not include a sonic choke.

In examples, where the SOV is a continuously variable valve, the SOV may be adjusted with increasing deflection towards the open second position from the closed first position with increasing boost levels, increasing canister loading and decreasing manifold vacuum.

In examples, where the CPBV is a binary valve and is only adjustable to either the closed first position or the open second position, routine 400 at 408 may include adjusting the CPBV to the open second position. However, in other examples, the routine 408 may include adjusting the CPBV to the closed first position. In examples where the CPBV is a continuously variable valve, the CPBV may be adjusted with increasing deflection towards the open second position from the closed first position with increasing boost levels, increasing canister loading and decreasing manifold vacuum. However in some examples, if canister loading increases a above a threshold, where the threshold represents a canister load level above which may result in excess fuel vapors being purged to the intake manifold, the CPBV may be closed, to limit the amount of fuel vapors flowing to the intake manifold 144. Since the CPBV may allow a greater amount of purge gasses to flow through it than the CPV, because the CPBV does not include a sonic choke like the CPV, purging efficiency during boosted conditions may be increased, relative to only flowing purge gasses through the CPV.

In examples, where the CPV is a binary valve and is only adjustable to either the closed first position or the open second position, routine 400 at 408 may include adjusting the CPV to the open second position. However, in other examples, the routine 408 may include adjusting the CPV to the closed first position. In examples where the CPV is a continuously variable valve, the CPV may be adjusted based on boost levels, canister loading, and manifold vacuum. For example, the CPV may be adjusted with increasing deflection towards the open second position with increasing canister loading to increase purging efficiency. However, the CPV, may be adjusted with increasing deflection towards the closed first position for decreasing manifold vacuum, to reduce backflow of gasses from an intake manifold (e.g., intake manifold 144 shown in FIG. 1) to the canister. However, in examples where a check valve (e.g., check valve 152 shown in FIGS. 1-2A) is included to prevent backflow of vapors from the intake manifold to the CPV, the CPV may remain in the open second position under all engine operating conditions, except for engine operating conditions where the canister loading exceeds a threshold, where the threshold may represent a canister loading level above which may result in excess fuel vapors supplied to the intake manifold. In some examples, the canister loading threshold may represent 60% of the fuel requirement of an engine (e.g., engine 102 shown in FIGS. 1-2B). Thus, if the canister loading is high enough that opening the CPV would result in more than approximately 60% of the fuel requirement of the engine to be supplied by purged vapors from the canister, then the CPV may be closed. Otherwise, the CPV may remain in the open second position.

Thus, the ratio of purge gasses flowing through the CPV and the second purge bypass conduit relative to the flow of purge gasses through the CPBV and the first purge bypass conduit may be adjusted based on one or more of a canister load, a time since a previous purge, intake manifold vacuum level, and a boost level. The CPV and CPBV may be adjusted to regulate the amount of purge gasses flowing through the second purge bypass conduit and the first purge bypass conduit, respectively. Increasing the opening of the CPV valve, may increase the vacuum applied to downstream of the CPV from the ejector. Increasing the opening of the CPBV may increase the vacuum generated upstream of the CPV. Thus, ratio of purge gasses flowing through the CPV and the second purge bypass conduit relative to the flow of purge gasses through the CPBV and the first purge bypass conduit, may be adjusted by adjusting the vacuum applied to downstream and upstream of the CPV, respectively.

The vacuum generated upstream of the CPV may be increased by adjusting the CPBV to a more open position. Thus, the ratio of purge gasses flowing through the CPV and second purge bypass conduit relative to the flow of purge gasses through the CPBV and the first purge bypass conduit, may be adjusted by adjusting the vacuum applied to downstream and upstream of the CPV respectively, where the vacuum applied downstream of the CPV may increase with increasing deflection of the CPV away from a closed position towards an open position, and where the vacuum applied upstream of the CPV may increase with increasing deflection of the CPBV away from a closed position towards an open position.

The ratio of purge gasses flowing through the CPV and second purge bypass passage relative to the CPBV and the first purge bypass passage may be adjust based on one or more of canister loading, boost pressure, intake manifold pressure, time since last purging operation, etc. Specifically, the ratio of purge gasses flowing through the CPBV and the first purge bypass passage relative to the CPV and second purge bypass may increase with increasing boost pressure, decreasing manifold vacuum (increasing manifold pressure), and increasing canister loading up to a threshold. Said another way, the amount of vacuum applied to upstream of the CPV relative to downstream of the CPV may increase with increasing boost pressure, decreasing manifold vacuum, and increasing canister loading. Thus, CPBV may be adjusted with increasing deflection towards a fully open position away from a closed position, for one or more of increases in boost pressure, decreases in manifold vacuum, and increases in canister loading. Additionally, or alternatively, the CPV may be adjusted with increasing deflection towards a closed position away from an open position for one or more of increases in boost pressure, decreases in manifold vacuum, and increases in canister loading during boosted conditions, where an intake manifold vacuum level is less than threshold (e.g., manifold air pressure is greater than a threshold).

During boosted conditions, the SOV may not be in a closed position. In some examples, the SOV may remain open under all engine operating conditions, except for conditions where a toque demand exceeds a threshold. So long as the SOV is not in the closed first position (during boosted conditions), purge gasses may flow from the canister to the ejector. By adjusting the positions of the CPV and/or CPBV, the relative amount of purge gasses flowing to the ejector through the CPV valve and second purge bypass conduit compared to that flowing to the ejector through the CPBV and first purge bypass conduit may be adjusted. Said another way, a ratio of purge gasses flowing in the first purge bypass conduit through the CPBV relative to the second purge bypass conduit through the CPV may be adjusted by adjusting the position of the CPBV and CPV. Specifically, if the position of the CPV is maintained constant, then the ratio of gasses flowing through the first purge bypass conduit relative to the second purge bypass conduit may increase with increasing deflection of the CPBV towards the open second position away from the closed first position, and vice versa. Similarly, if the position of the CPBV is maintained constant, then the ratio of gasses flowing through the first purge bypass conduit relative to the second purge bypass conduit may decrease with increasing deflection of the CPV towards the open second position away from the closed first position and vice versa. While the CPV is open purge gasses may also flow to the intake manifold, depending on the pressure differential between the canister and the intake manifold. However, if the CPV is closed, and the SOV is not closed, purge gasses may only flow through the first purge bypass conduit and the CPBV to the ejector en route to upstream of the compressor. Thus, if the CPV is closed, and the SOV and CPBV are not closed, then purge gasses may only flow through the first purge bypass conduit, and not through either the CPV, first purge bypass conduit, or purge conduit (e.g., purge conduit 119 shown in FIG. 1).

Since the CPBV may allow a greater amount of purge gasses to flow through it than the CPV, because the CPBV does not include a sonic choke like the CPV, purging efficiency during boosted conditions may be increased, relative to only flowing purge gasses through the CPV.

Routine 400 may continue to 410 and flow compressed air from downstream of the compressor and upstream of throttle through the ejector to the compressor inlet in a similar manner as described above with reference to 340 of routine 300 in FIG. 3. After generating vacuum at the ejector by recirculating air around the compressor, routine 400 may then continue to 412 and apply vacuum from the intake manifold and/or ejector to the purge canister in a similar manner to that described at 342 of routine 300 in FIG. 3.

Thus, the method 400 at 412 may include drawing vacuum at the neck of the ejector and supplying the drawn vacuum to downstream of the CPV at 414. Additionally, the method 400 at 412 may include drawing vacuum at the neck of the ejector and applying the drawn vacuum to upstream of the CPV at 416. Method 400 may then proceed from 412 to 418 which comprises using the applied vacuum to draw purged vapors from the canister to a compressor inlet via the ejector and/or to the intake manifold. Application of the vacuum generated at the ejector to upstream of the CPV may be initiated by opening the CPBV valve. Thus, the method 400 at 418 may include flowing vapors through the CPBV at 422. Similarly, application of the vacuum generated at the ejector to downstream of the CPV may be initiated by opening the CPV. Thus, the method 400 at 418 may include flowing vapors through the CPV at 420. Thus, in some examples, the vacuum generated at the ejector may be applied to only upstream of the CPV and not downstream of the CPV, by closing the CPV, and opening the CPBV. In other examples, the vacuum generated at the ejector may be applied to only downstream of the CPV and not to upstream of the CPV, by closing the CPBV and opening the CPV. In still further examples, the vacuum generated at the ejector may be applied to both upstream of the CPV and downstream of the CPV by opening both the CPV and CPBV. Thus, if the CPBV is opened such as at 422, vapors from the canister may be flowed through the CPBV.

Vapors may then be received from the ejector in the intake manifold at 424. Thus the routine 400 at 424 may comprise flowing the vapors purged through the ejector to upstream of the compressor, through the compressor, and the throttle, into the intake manifold.

Based on the quantity of fuel vapors received from the canister, engine fueling may be adjusted at 426. Thus, an amount of fuel injected and/or fuel injection timing may be adjusted in response to an amount of fuel vapors received from the canister. In one example, the fuel injection amount and/or timing may be adjusted to maintain a cylinder air-fuel ratio at or close to a desired ratio, such as stoichiometry. For example, fuel injection amount may be decreased in response to an increase in fuel vapors received from the canister. Routine 400 then ends.

In this way, a method may comprise during boosted conditions, generating vacuum by recirculating compressed air through an ejector coupled in a compressor bypass passage, applying a first portion of the vacuum on a purge line downstream of a canister purge valve, and applying a second, remaining portion of the vacuum on the purge line upstream of the canister purge valve. The method may further comprise adjusting a ratio of the first portion of vacuum relative to the second portion of vacuum applied based on one or more of a canister load, a time since a previous purge, intake manifold vacuum level, and boost level. Additionally or alternatively, the adjusting the ratio may include, as the canister load increases, increasing the first portion of the vacuum applied on the purge line downstream of the canister purge valve relative to the second portion of the vacuum applied on the purge line upstream of the canister purge valve. Applying the first portion of the vacuum on the purge line downstream of the canister purge valve may include flowing fuel vapors from a canister to a compressor inlet via each of the canister purge valve and a check valve.

In some examples, the applying the second portion of the vacuum on the purge line upstream of the canister purge valve may include flowing fuel vapors from the canister to the compressor inlet via a bypass valve, without flowing fuel vapors via the canister purge valve. Flowing fuel vapors from the canister to the compressor inlet via the bypass valve may additionally or alternatively comprise flowing the fuel vapors into a suction port of the ejector. In still further examples, flowing fuel vapors from the canister to the compressor inlet via the bypass valve may further include flowing the fuel vapors from the bypass valve into the suction port of the ejector via a check valve. The bypass valve may be a low restriction valve adjustable between a first fully open position and a second fully closed position. The method may additionally comprise during non-boosted conditions, applying vacuum from an intake manifold to the purge line downstream of the canister purge valve. In yet further examples, the applying vacuum from the intake manifold to the purge line fuel vapors may include flowing fuel vapors from the canister to the intake manifold via the canister purge valve, and not via the bypass valve.

In another representation, a method for a boosted engine may comprise, during a first condition, flowing stored fuel vapors from a canister into an intake manifold via a canister purge valve, during a second condition, flowing stored fuel vapors from the canister into a suction port of an ejector coupled in a compressor bypass passage, the stored fuel vapors flowing through a bypass passage circumventing the canister purge valve, and during a third condition, flowing stored fuel vapors from the canister into each of the suction port of the ejector and the intake manifold via the canister purge valve, the stored fuel vapors flowing into the suction port of the ejector via each of the canister purge valve and a check valve. In some examples, during the first condition, the stored fuel vapors may not flow through a bypass valve coupled in the bypass passage or the check valve. During the second condition, the stored fuel vapors may not flow through the purge valve or the check valve. During the third condition, the stored fuel vapors may not flow through the bypass valve. In some examples, the first condition may include engine operation with natural aspiration, and wherein each of the second and third conditions may include engine operation with boost, a boost level during the second condition being higher than the boost level during the third condition. During the first condition, intake manifold vacuum may be higher than an upper threshold, and during the second condition, the intake manifold vacuum may be lower than a lower threshold, and wherein during the third condition, the intake manifold vacuum may be between the upper and lower threshold.

The method may additionally comprise, during each of the second and third conditions, adjusting a flow of compressed air through the compressor bypass passage based on each of boost pressure and canister load. Adjusting the flow of compressed air through the compressor bypass passage may in some examples include increasing an opening of an ejector shut-off valve to increase recirculation of compressed air from downstream of an intake compressor, and upstream of a charge air cooler to upstream of the compressor via the compressor bypass passage.

In a further representation, a method may comprise: during a first boosted condition, flowing stored fuel vapors from the canister into a suction port of an ejector coupled in a compressor bypass passage, the stored fuel vapors flowing through a bypass passage circumventing the canister purge valve, and during a second boosted condition, flowing stored fuel vapors from the canister into the suction port of the ejector via each of the canister purge valve and the bypass passage. In some examples, the first boosted condition may include a boost level higher than a first threshold, and wherein the second boosted condition includes the boost level being lower than the first threshold.

In yet another representation, a method for a boosted engine may comprise: flowing a first portion of canister fuel vapors to an engine intake via a canister purge valve, flowing a second portion of canister fuel vapors from upstream of the canister purge valve to a compressor inlet via each of a bypass valve and an ejector, flowing a third portion of canister fuel vapors from downstream of the canister purge valve to the compressor inlet via only the ejector, and adjusting a ratio of the first, second, and third portion based on boost levels and pressure in the intake manifold.

Referring now to FIG. 5, it presents graph 500 illustrating a comparison between purge flow rates through an ejector (e.g., ejector 180 shown in FIG. 1) when the ejector is only coupled to downstream of a CPV (e.g., CPV 164 shown in FIG. 1) and when the ejector (e.g., ejector 180) is coupled to both upstream and downstream of the CPV. Graph 500 depicts suction flow rate along the y-axis and intake vacuum levels along the x-axis. Further, plot 502 in graph 500 represents an example flow rate through a single CPV, such as CPV 164 of FIG. 1. Thus, plot 502 represents suction flow rates at the ejector when purge gasses may only flow to the ejector through a single CPV and a second purge bypass conduit (e.g., second purge bypass conduit 123 shown in FIG. 1). Plot 504, represents suction flow rates to the ejector through a CPV and a CPBV (e.g., CPBV 184 shown in FIG. 1). Thus, plot 504 represents suction flow rates at the ejector when purge gasses may flow to the ejector through the second purge bypass conduit and CPV, and through a first bypass conduit (e.g., first purge bypass conduit 121 shown in FIG. 1) which bypasses the CPV, and includes a low restriction CPBV valve. Plot 506 represents the vacuum produced by an ejector at a given boost pressure. If vacuum generated by the ejector is applied only to downstream of the CPV, purge flow rate through the ejector may be that indicated at the intersection of plot 502 and the ejector suction flow rate plots (e.g., 508). On the other hand, if the vacuum from the ejector is directly applied to upstream of the CPV, the purge flow rate through the ejector may be increased relative to that when purge flow is only allowed through the CPV, as shown at plot 504. For example, purge flow through the ejector at the boost pressure plot 506 when the ejector is coupled only to downstream of the CPV may be indicated by flow rate at 508 (e.g., intersection of plot 502 and plot 506).

If, on the other hand, the ejector is coupled to both upstream and downstream of the CPV, flow rate through the ejector at the first boost pressure may be shown in graph 500 where plot 504 intersects with the boost pressure plot 506 at 510. Thus, by coupling the ejector to both upstream and downstream of the CPV, a less restricted purge flow path may be created to the ejector and purge flow rate may be considerably increased. More specifically, since the CPV comprises a sonic choke, and the CPBV does not, the CPBV and first purge bypass conduit, provide a less restrictive flow path for purge gasses to the ejector than through the CPV. As such, the flow of purge gasses to the ejector when an SOV (e.g., SOV 185 shown in FIG. 1) is open to generate vacuum at the ejector, may be increased, relative to only flowing purge gasses through the CPV en route to the ejector.

Turning now to FIG. 6, it shows map 600 illustrating an example purging operation in an example engine system, such as that of FIG. 1, during boosted and non-boosted conditions in accordance with the present disclosure. Map 600 includes an indication of purge flow through an ejector (e.g., ejector 180 shown in FIG. 1), at plot 602, a position of a SOV (e.g., SOV 185 shown in FIG. 1) at plot 604, CPV (e.g., CPV 164 shown in FIG. 1) operation at plot 608, position of a CPBV (e.g., CPBV 184 shown in FIG. 1) at plot 606, canister load at plot 612, intake manifold pressure (MAP) at plot 614, boost pressure at plot 618, and engine speed at plot 620. All the above are plotted against time on the x-axis and time increases from the left to the right along the x-axis. Further, line 613 represents a threshold canister load above which it may be determined that canister purging conditions are presented as discussed above with reference to FIG. 3. Line 617 represents a lower first threshold for manifold air pressure, which may represent an upper first threshold for manifold vacuum level (e.g., upper first threshold described in FIGS. 3 and 4). Thus, line 617 may represent manifold vacuum levels, where the MAP levels below line 617 may represent vacuum levels that increase above a first threshold. Line 617 may represent MAP levels, above which represent boosted engine conditions, and below which represent non-boosted engine conditions. Thus, between t0 and t1, t4 and t7, and after t10, the engine may not be boosted. Line 619 represents an upper second threshold for manifold air pressure, which may represent a lower second threshold for manifold vacuum level (e.g., lower second threshold described in FIGS. 3 and 4). Thus, line 619 may represent manifold vacuum levels, where the MAP levels above line 619 may represent vacuum levels that decrease below a second threshold.

Between t0 and t1, the engine may be at idle wherein non-boosted conditions may be present. Since canister load is greater than threshold canister load (line 613), and the engine is operating with a vacuum condition (manifold pressure is significantly lower than the first threshold (plot 617) shown at 614, a purge flow may be initiated by opening the CPV (plot 608). As such, opening of the CPV indicates an activation of the solenoid valve such that it pulses between an open and a closed position at a higher frequency. Since the engine is not boosted, the SOV may be adjusted to a fully closed position (plot 604) and there may be no purge flow through the ejector (plot 602). Further, since the SOV is closed, the bypass valve (e.g., CPBV 184) may also be closed between t0 and t1. Between t0 and t1, therefore, substantial purge flow may occur through the CPV directly into the intake manifold.

At t1, an operator may depress an accelerator and engine speed may increase significantly. In response to the depression of the accelerator, boost pressure at the intake throttle may rise rapidly (plot 618). Thus, the MAP may increase above the lower first threshold. The CPV may be maintained in an open position since the canister load is still above the threshold (612). In response to the increase in MAP above the lower first threshold (decrease in vacuum level below the upper first threshold), the position of the SOV may be adjusted with increasing deflection towards the open position and away from the closed position with increasing boost pressure (plot 604). As such, purge flow through the ejector may be initiated at t1. Accordingly, between t1 and t2, purge flow through the ejector may increase as boost pressure increase and the SOV is adjusted towards a more open position.

At t2, MAP may reach the upper second threshold (lower second threshold for manifold vacuum level). In response to the MAP reaching the upper second threshold, the bypass valve may be opened at t2. The SOV may be opened to the fully open position at t2. Further, the CPV may be maintained in the open position. Thus, purge gasses may be flowing through the CPV and the bypass valve at t2, so long as the canister load stays above the threshold, and canister purging conditions are present.

Between t2 and t3, MAP may fluctuate above the upper second threshold. Further the canister load may continue to fluctuate above the threshold. As such, the SOV may remain open, purge flow through the ejector may continue, and both the CPV, and the bypass valve may remain open. Accordingly, purge vapors may stream from the canister (e.g. canister 122 shown in FIG. 1 into the ejector via a first purge bypass line including the CPBV (e.g., first purge bypass conduit 121 shown in FIG. 1), and a second purge bypass line including the CPV (e.g., second purge bypass conduit 123 in FIG. 1). Thus, after t2, purge flow of fuel vapors may occur primarily through the ejector into the compressor inlet.

At t3, engine speed may decrease, and corresponding, MAP and boost pressure may decrease. MAP may decrease below the upper second threshold, but remain above the lower first threshold. As such, the SOV may be maintained in an open position and purge gasses may still flow to the ejector. The bypass valve may begin to be closed at t3.

Between t3 and t4, boost pressure may continue to decrease and so does MAP, but MAP does not decrease below the lower first threshold. As such, the SOV may remain open, as does the CPV. The bypass valve, however may be adjusted with increasing deflection away from the open position towards the closed position for decreases in the boost pressure. The canister load may remain above the threshold. Thus, purge flow through the ejector may continue between t3 and t4.

At t4 an engine idling condition may occur. MAP decreases below the lower first threshold, and accordingly, the SOV may be closed. Thus, purge gasses may not flow through the ejector. The CPV may remain open at t4 as canister load is still above the threshold. Since the SOV is closed at t4, the CPBV may also be closed at t4.

Between t4 and t5, manifold air pressure may remain below the lower first threshold, and as such, the SOV, and bypass valve may remain closed. There may be substantially no purge flow through the ejector. The CPV valve may remain open as the canister load is still above the threshold.

At t5, the engine may be shut down and may be at rest. As such, the engine may be turned "off" in a key-off condition. Further, a refueling event may occur between t5 and t6. Thus, in the depicted example, the engine may be shut down and at rest during a vehicle refueling between t5 and t6. Further, between t5 and t6, the CPV may be closed. Accordingly, canister load increases between t5 and t6 as the amount of stored fuel vapors in the canister rises during the refueling event.

At t6, engine start may occur subsequent to the refueling event. Engine start may be followed by a gradual rise in engine speed as the vehicle starts moving. Between t6 and t7, the MAP increases, as engine speed and boost pressure increase, but MAP does not increase above the lower first threshold. Therefore, the SOV may remain closed. As such purge vapors may not flow through the ejector and the bypass valve may remain closed. However, due to the increase in canister loading from the refueling event, the CPV may be opened at t6 and may remain open between t6 and 67.

At t7, MAP may increase above the lower first threshold, as engine speed and boost pressure continue to increase. Thus, the SOV may be adjusted to a fully open position at t7, and purge gasses may begin to flow through the ejector. At t7 the bypass valve may be adjusted towards a more open position, and the CPV may be adjusted towards a more closed position. Between t7 and t8, the CPV may be adjusted with increasing deflection towards the closed position away from the open position as MAP increases (intake manifold vacuum decreases) and boost pressure increases. However the bypass valve may be adjusted with increasing deflection towards the open position away from the closed position for increasing MAP. Thus, the ratio of gasses flowing through the first purge bypass conduits relative to the second purge bypass conduit may be increased between t7 and t8. In this way, the ratio of purge flow between the two purge bypass conduits may be adjusted by adjusted the CPV and bypass valve.

At t8 MAP may increase above the upper second threshold, and thus, the SOV may remain open, as well as the bypass valve. However, the CPV may be closed, and thus, between t8 and t9, purge flow through the ejector may only be drawn from the canister through the first purge bypass conduit comprising the bypass valve, and not through the CPV valve or the second purge bypass conduit. The canister load may continue to be above the threshold.

At t9, the MAP may decrease below the upper second threshold. The SOV may be adjusted away from the open position, and between t9 and t10, the SOV may be adjusted with increasing deflection towards the closed position as the boost pressure continues to decrease below the upper second threshold, down to the lower first threshold between t9 and t10. The bypass valve may remain in the fully open position between t9 and t10. Further, the CPV may remain closed. Thus purge gasses may still flow through the ejector, but only through the first purge bypass conduit.

At t10 the, MAP decreases below the lower first threshold as engine seed and boost pressure continue to decrease. MAP, continues to fluctuate below the lower first threshold after t10. As such, the SOV may be closed at t10 and may remain closed after t10. Further, the bypass valve may be switched from the open position to the closed position at t10 and may remain closed after t10. Since the canister load decreases below the threshold at t10, the CPV may remain closed at and after t10 as well.

In this way, systems and methods are provided which may enable a more complete purging of a fuel vapor canister by providing an alternative and additional purge path for desorbed fuel vapors via an ejector that is not encumbered by a flow restriction such as a sonic choke. Stored fuel vapors from the fuel system canister may flow into an engine intake during boosted conditions via the CPV and/or via the ejector in the compressor bypass passage. Vacuum generated at the ejector, and therefore an amount of purge gasses flowing to the ejector may be regulated by adjusting the position of a SOV. Flow into the intake manifold via the CPV may occur only when canister pressure is higher than the manifold pressure. Purge flow through the ejector may occur as long as a vacuum is generated by the ejector during motive flow through the ejector. Further, during non-boosted conditions such as engine idle, the ejector may not generate sufficient vacuum to draw purge vapors from the canister. In such engine conditions, the SOV may be closed. As such, during non-boosted conditions, vacuum in the intake manifold may draw desorbed vapors from the canister more easily. Since a higher pressure difference may be present between the canister and the intake manifold, purge flow may largely occur via a purge conduit (e.g., purge conduit 119 shown in FIG. 1) through the CPV. Furthermore, the substantial pressure difference between canister pressure and manifold vacuum may produce a higher purge flow rate through the CPV that may be metered and regulated by a flow restriction e.g., the sonic choke in the CPV.

However, during boosted conditions, the SOV may be opened to allow vacuum to be generated at the ejector, and as such, purge gas flow to the ejector may be regulated by adjusting one or more of the CPV and a CPBV. Since the CPBV is positioned in a first purge bypass conduit that bypasses the CPV, purge flow efficiency may be increased. The CPBV may not contain a sonic choke like the CPV, and thus, an increased amount of purge gasses may flow to the ejector from the canister by flowing through the first purge bypass conduit. In some examples, the CPBV and the CPV may be opened to allow purge gasses to flow to the ejector through both the first purge bypass conduit and the second purge bypass conduit. However, opening the CPV valve may allow gasses to travel between the CPV and the intake manifold, whereas only opening the CPBV only allows gasses to travel between the canister and the ejector en route to the intake manifold, and not between the canister and directly to the intake manifold. The ratio of gasses flowing in the first purge bypass conduit relative to the second purge bypass conduit may be adjusted by adjusting the CPBV and/or CPV valve. Thus, by opening the CPBV and/or closing the CPV, the ratio of gasses flowing in the first purge bypass conduit relative to the second purge bypass conduit may be increased, and vice versa.

Thus, a technical effect of increasing an amount of purge gasses purged from a fuel vapor canister may be increased by providing two different flow paths for purge gasses to flow from the canister to an ejector during boosted conditions. Another technical effect of increasing an amount of purge gasses purged from a fuel vapor canister during shallow intake manifold vacuum levels may be achieved by routing all or a portion of gasses from the canister through a conduit bypassing a CPV, where the conduit may include a low restriction bypass valve. In this way, during engine operating conditions where the boost level is greater than a threshold, and/or intake manifold vacuum levels are below a threshold, purge flow from the canister may be increased by providing vacuum to upstream of the CPV by way of a purge bypass conduit that bypasses the CPV. As such, gasses from the canister may flow around the CPV, and may not be forced to flow through a sonic choke of the CPV. As such, purge gasses may alternatively or additionally flow through a low restriction valve positioned in the purge bypass conduit that does not include a sonic choke. Therefore, by providing two paths for purge gasses to flow from the canister to the ejector, where one flow path may include a valve with a sonic choke, while the other may not, the amount of purge gasses flowing to the ejector may be increased.

Since the ejector may generate a vacuum during boosted engine operating conditions, and during conditions where manifold vacuum levels are less than a threshold, vacuum may be applied to the canister purge during both boosted and non-boosted conditions for purging the canister. When the vacuum levels in the intake manifold are sufficiently high, the canister may be purged directly to the intake manifold via the CPV. The flow of gasses may be restricted by the sonic choke so that, the amount of hydrocarbons flowing to the intake manifold may be restricted and/or regulated to maintain an air/fuel ratio. However, during boosted conditions, gasses may bypass the CPV and may flow in a greater amount to the ejector through a bypass valve which may not include a sonic choke.

In another representation, a method may comprise maintaining a CPV in an open position during engine operation so long as a canister load is below a threshold. Said another way, the CPV may only be closed when the canister load exceeds a threshold. During non-boosted engine operating conditions while the CPV is open, fuel vapors from the canister may be purged to an intake manifold. However, during boosted engine operating conditions, where a throttle inlet pressure is greater than a compressor inlet pressure, the method may comprise opening a shut-off valve coupled in a compressor bypass passage, and flowing air through an ejector coupled in the bypass passage. The compressor bypass may be coupled across the bypass. In some examples, the SOV may only be closed during non-boosted engine operating conditions. Flowing air through the ejector in the bypass passage may draw suction at a neck of the ejector, which may be used to draw fuel vapors from the canister. Thus, compressed air from downstream of a compressor may be recirculated to upstream of a compressor through an ejector. The ejector may be coupled to a canister for drawing fuel vapors therefrom. As such, gasses flowing through the compressor bypass to upstream of the compressor may include a mixture of compressed intake air, and fuel vapors from the canister.

In some examples, the ejector may be coupled to the CPV along a first purge bypass conduit for drawing fuel vapors from the CPV during boosted conditions where the SOV is open, when the CPV is open. Additionally or alternatively, a CPBV may be positioned in a second purge bypass passage, so that fuel vapors from the canister may flow to the ejector through the CPBV when the SOV is open during boosted engine conditions. As such, during boosted engine conditions where the SOV is open, the CPV may remain open, and the CPBV may be opened to increase an amount of fuel vapors flowing from the canister to the ejector, and upstream of the compressor. However, the CPBV may remain closed when the SOV is closed.

In this way, an amount of purge gasses flowing to the inlet of the compressor relative to the intake manifold may be adjusted by adjusting the position of the shut-off valve, while maintaining the canister purge valve in an open position. Additionally, when the shut-off valve is open, an amount airflow from the canister to the ejector and upstream of the compressor may be increased by opening the CPBV.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during a first boosted condition, flowing stored fuel vapors from a canister into a suction port of an ejector coupled in a compressor bypass passage, the stored fuel vapors flowing through a canister purge bypass passage circumventing a canister purge valve; and
   during a second boosted condition, flowing stored fuel vapors from the canister into the suction port of the ejector via each of the canister purge valve and the bypass passage.

2. The method of claim 1, wherein the first boosted condition includes a boost level higher than a first threshold, and wherein the second boosted condition includes the boost level lower than the first threshold.

3. The method of claim 1, wherein during the first boosted condition, the stored fuel vapors flow through a bypass valve in the canister purge bypass passage and do not flow through the canister purge valve.

4. The method of claim 1, further comprising, during each of first and second boosted condition, adjusting a flow of compressed air through the compressor bypass passage based on each of boost pressure and canister load.

5. The method of claim 4, wherein the adjusting includes increasing an opening of an ejector shut-off valve to increase recirculation of compressed air from downstream of an intake compressor and upstream of a charge air cooler to upstream of the compressor via the compressor bypass passage as canister load and boost pressure increases.

6. The method of claim 4, further comprising, during each of the first and second condition, adjusting an opening of an intake throttle coupled downstream of the compressor based on each of boost pressure and canister load.

7. The method of claim 4, wherein adjusting a flow of compressed air through the compressor bypass passage includes adjusting the flow of compressed air recirculated through the ejector coupled in the compressor bypass passage.

8. The method of claim 7, wherein flowing stored fuel vapors from the canister into the suction port of the ejector during the first and second boosted condition includes applying vacuum generated by recirculating compressed air through the ejector on the canister.

9. The method of claim 8, wherein during the first boosted condition, the generated vacuum is applied on a purge line coupled upstream of the canister purge valve, and wherein during the second boosted condition, the generated vacuum is applied on each of the purge line coupled upstream of the canister purge valve and a purge line coupled downstream of the canister purge valve.

10. The method of claim 9, wherein during the second boosted condition, a ratio of a first portion of the generated vacuum applied on purge line coupled upstream of the canister purge valve relative to a second portion of the generated vacuum applied to the purge line coupled downstream of the canister purge valve is based on one or more of the canister load, a time since a previous purge, and the boost pressure.

11. The method of claim 10, wherein during the second boosted condition, as the canister load increases, the second portion of the vacuum applied on the purge line downstream of the canister purge valve is increased relative to the first portion of the vacuum applied on the purge line upstream of the canister purge valve.

12. The method of claim 9, further comprising during non-boosted conditions, applying vacuum from an intake manifold to the purge line downstream of the canister purge valve.

13. The method of claim 1, wherein flowing stored fuel vapors via the canister purge valve during the second boosted condition includes synchronizing an opening of the canister purge valve with a cylinder combustion event.

14. A method for an engine, comprising:
   in response to purging conditions being met,
   purging a fuel vapor canister with a canister purge valve, coupled in a first purge line between the canister and an engine intake manifold, open when manifold vacuum is above a threshold; and
   purging the fuel vapor canister with the canister purge valve closed and a canister purge bypass valve coupled in a second purge line between the canister and the engine intake manifold, open when the manifold vacuum is below the threshold, the second purge line bypassing the canister purge valve.

15. The method of claim 14, further comprising, when the manifold vacuum is above the threshold, purging the fuel vapor canister with a canister purge bypass valve coupled in the second purge line closed, and when the manifold vacuum is below the threshold, purging the fuel vapor canister with the canister purge bypass valve open.

16. The method of claim 14, wherein the engine is a boosted engine including an intake compressor, the method further comprising, when the manifold vacuum is above the threshold, purging the fuel vapor canister with a shut-off valve coupled in a compressor bypass closed, and when the manifold vacuum is below the threshold, purging the fuel vapor canister with the shut-off valve open.

17. The method of claim 16, wherein when the manifold vacuum is above the threshold, the purging includes applying intake manifold vacuum on the canister via the first purge line, and when the manifold vacuum is below the threshold, the purging includes applying vacuum generated at an ejector coupled in the compressor bypass on the canister via the second purge line.

18. The method of claim 14, wherein when the manifold vacuum is above the threshold, fuel vapors are purged from the canister to an engine intake manifold, downstream of an intake throttle, and wherein when the manifold vacuum is below the threshold, fuel vapors are purged from the canister to the engine intake manifold, upstream of the intake throttle.

* * * * *